US008000888B2

(12) United States Patent
Kim et al.

(10) Patent No.: US 8,000,888 B2

(45) Date of Patent: Aug. 16, 2011

(54) SYSTEM AND METHOD FOR INFORMATION SUPPLYING SERVICE

(75) Inventors: Kyung-woo Kim, Yongin-si (KR); Ik-soo Bae, Seoul (KR); Hyung-min Ban, Sungnam-si (KR); Kyu-woong Kim, Sungnam-si (KR)

(73) Assignee: Posdata Co., Ltd., Seongnam-Si (KR)

( * ) Notice: Subject to any disclaimer, the term of this patent is extended or adjusted under 35 U.S.C. 154(b) by 971 days.

(21) Appl. No.: 11/722,679

(22) PCT Filed: Dec. 23, 2005

(86) PCT No.: PCT/KR2005/004506

§ 371 (c)(1), (2), (4) Date: Oct. 18, 2007

(87) PCT Pub. No.: WO2006/068452

PCT Pub. Date: Jun. 29, 2006

(65) Prior Publication Data

US 2008/0140305 A1 Jun. 12, 2008

(30) Foreign Application Priority Data

| | | |
|---|---|---|
| Dec. 23, 2004 | (KR) | 10-2004-0111299 |
| Dec. 23, 2004 | (KR) | 10-2004-0111301 |
| Dec. 23, 2004 | (KR) | 10-2004-0111305 |
| Dec. 23, 2004 | (KR) | 10-2004-0111306 |
| Dec. 23, 2004 | (KR) | 10-2004-0111308 |
| Dec. 23, 2004 | (KR) | 10-2004-0111316 |
| Dec. 23, 2004 | (KR) | 10-2004-0111319 |
| Dec. 23, 2004 | (KR) | 10-2004-0111323 |
| Dec. 23, 2004 | (KR) | 10-2004-0111324 |
| Dec. 23, 2004 | (KR) | 10-2004-0111326 |
| Dec. 23, 2004 | (KR) | 10-2004-0111328 |

(51) Int. Cl.
*G08G 1/0968* (2006.01)
*G01C 21/00* (2006.01)

(52) U.S. Cl. ................. 701/117; 340/995.13; 455/422.1

(58) Field of Classification Search .................. 701/117; 455/422.1, 453; 340/995.13
See application file for complete search history.

(56) References Cited

U.S. PATENT DOCUMENTS

| | | | | |
|---|---|---|---|---|
| 6,297,748 | B1 * | 10/2001 | Lappenbusch et al. | 340/905 |
| 6,850,842 | B2 * | 2/2005 | Park | 701/210 |
| 6,922,629 | B2 * | 7/2005 | Yoshikawa et al. | 701/117 |
| 7,430,218 | B2 * | 9/2008 | Lee et al. | 370/464 |
| 2004/0009766 | A1 * | 1/2004 | Hong | 455/422.1 |

FOREIGN PATENT DOCUMENTS

| | | |
|---|---|---|
| KR | 1997-0078056 A | 12/1997 |
| KR | 2000-0034985 A | 6/2000 |
| KR | 2001-0044730 A | 6/2001 |
| KR | 2002-0016993 A | 3/2002 |

(Continued)

*Primary Examiner* — Tan Q Nguyen

(57) ABSTRACT

Disclosed is a system and a method for collecting various road traffic information, road image information, and position information of a position information generation device carried by an object, the position of which is to be tracked, by interworking with an information provision means and using the collected information to provide service subscribers with real-time traffic information, traffic prediction, or position information of the object via wireless Internet, satellite broadcasting, DMB, or cable data broadcasting. The system and method can provide detailed traffic information service regarding a specific region or location on a nationwide scale, predict traffic to properly deal with it, and easily provide position information of an object to be tracked.

24 Claims, 17 Drawing Sheets

FOREIGN PATENT DOCUMENTS

| | | | |
|---|---|---|---|
| KR | 2002-0025319 | A | 4/2002 |
| KR | 2002-0025368 | A | 4/2002 |
| KR | 2002-0031448 | A | 5/2002 |
| KR | 2003-0024460 | A | 3/2003 |
| KR | 2003-0073559 | A | 9/2003 |
| KR | 10-2004-0019543 | A | 3/2004 |
| KR | 10-2004-0021071 | A | 3/2004 |
| KR | 10-2004-0050459 | A | 6/2004 |
| WO | WO 03/014671 | A1 | 2/2003 |

* cited by examiner

[Fig. 1]
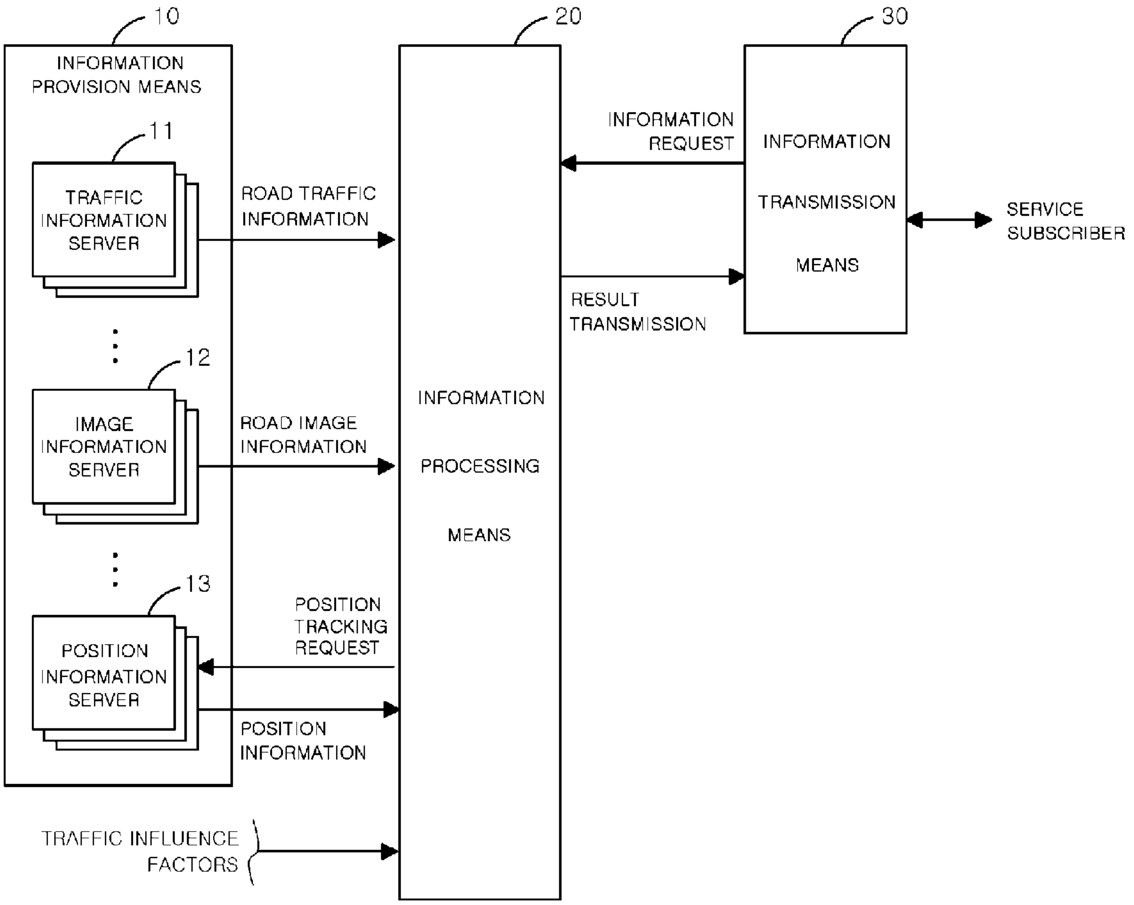

[Fig. 2]
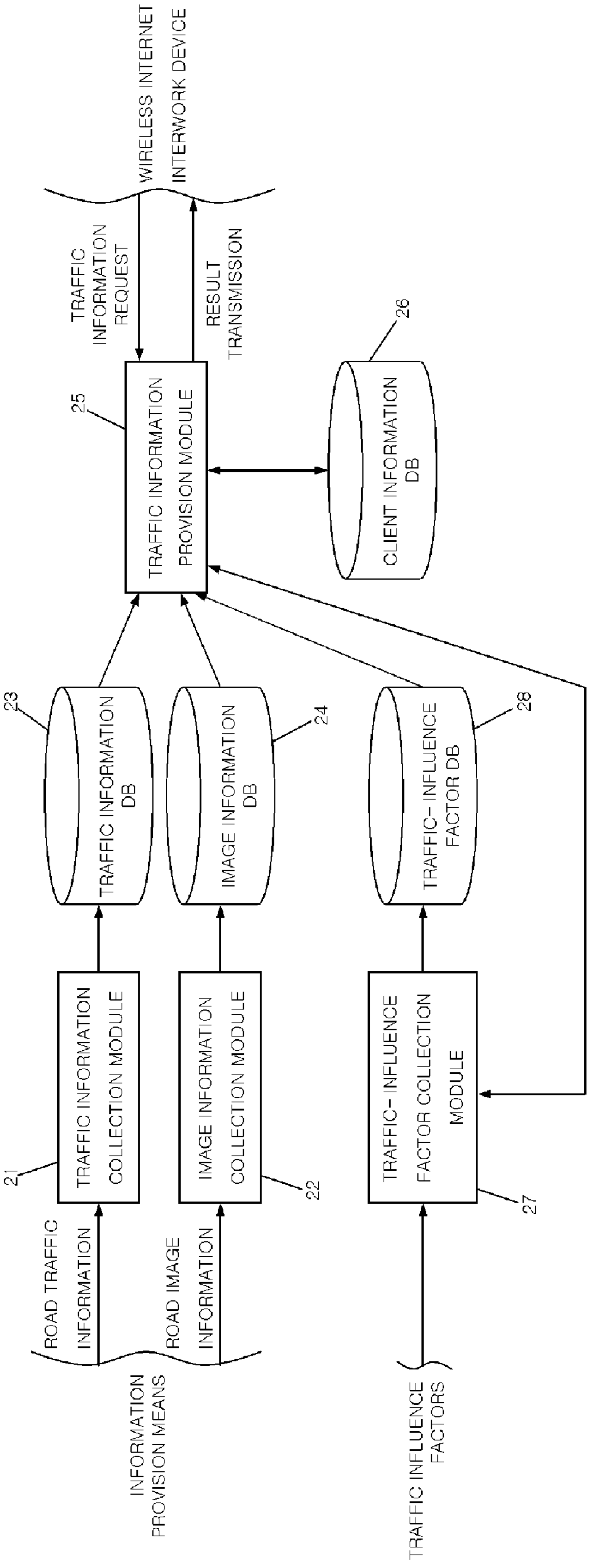

[Fig. 3]
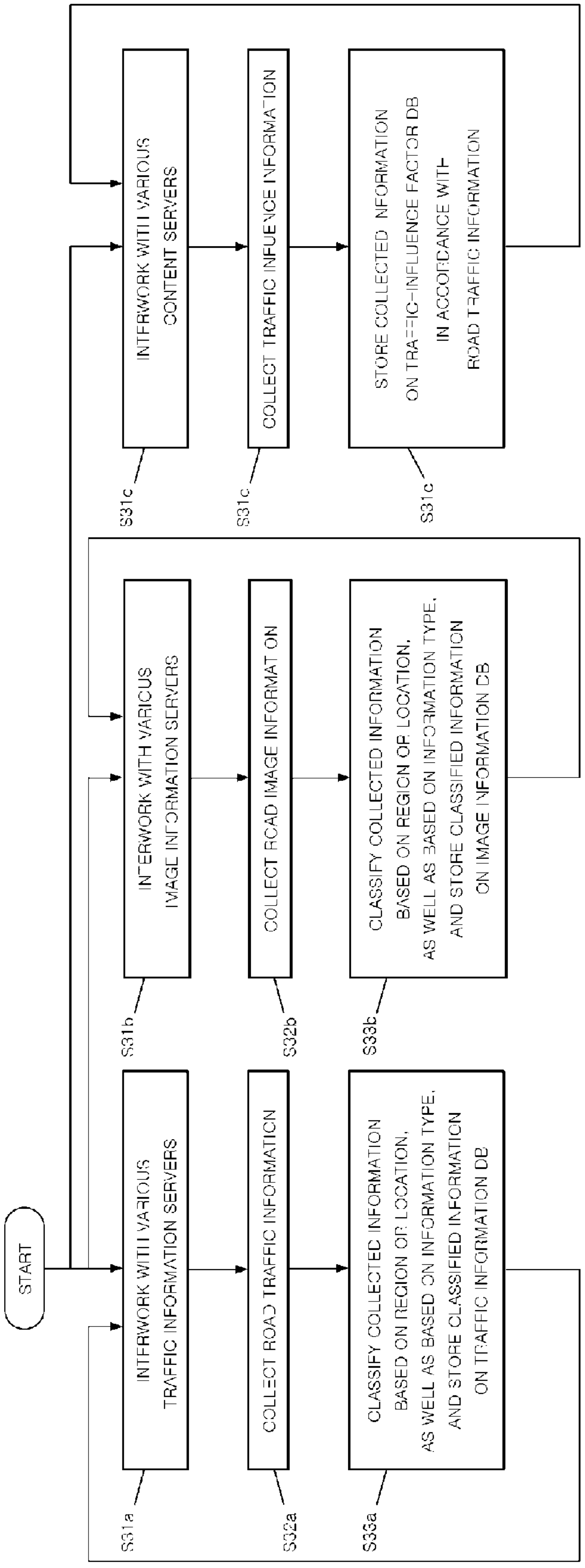

[Fig. 4]
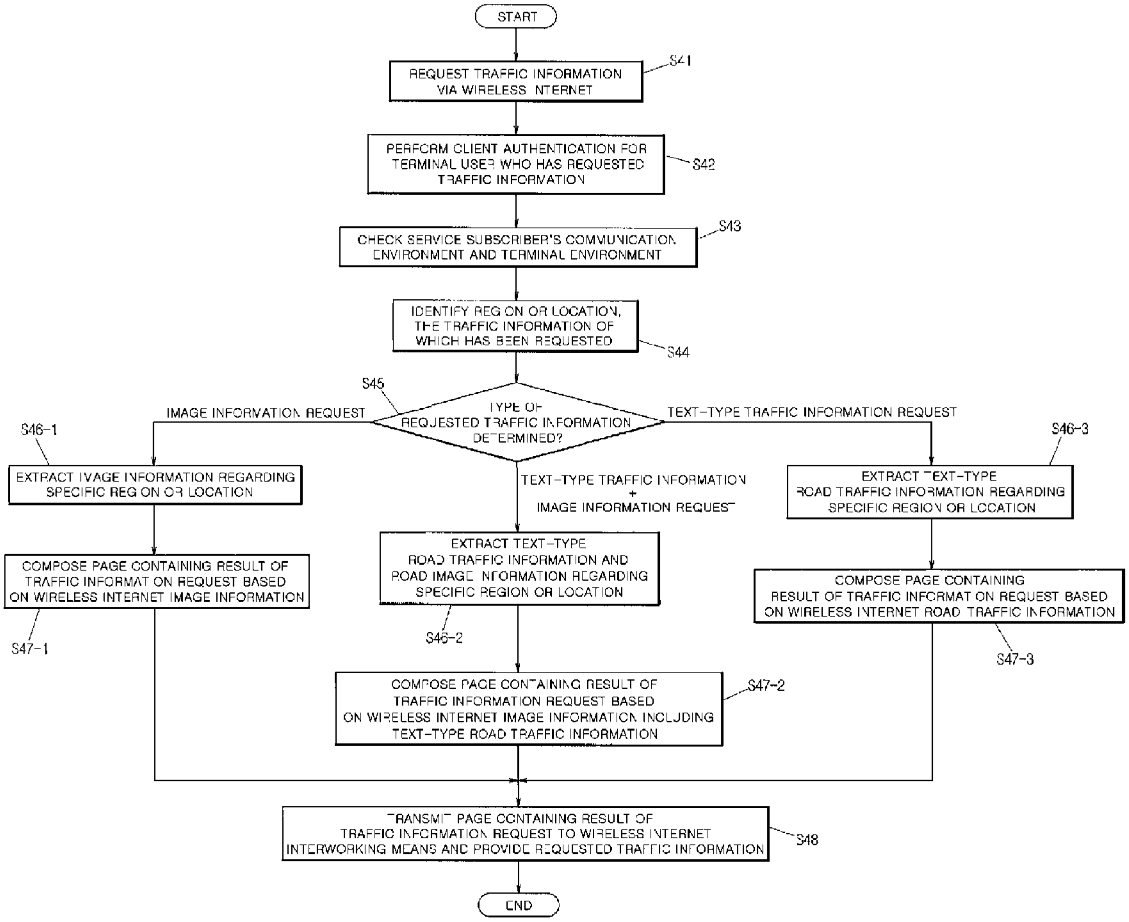

[Fig. 5]

(a)

「Traffic information service」

* Public notice
(1) Metropolitan traffic information
(2) Expressway traffic information
(3) Local road traffic information
(4) Shortcut guide
(5) Frequently-traveled road guide
(6) SMS setting
(7) Information utilization fee guide (b)

「Metropolitan traffic information」

(1) Traffic conditions around Han River
(2) Vehicle-only road
(3) Major roads
(4) Major tunnels
(5) Downtown traffic information

►

「Traffic conditions around Han River」

(1) North Riverside Road
(2) Olympic road
(3) Haengjoo Bridge ↔ Sungsan Bridge
(4) Yanghwa Bridge ↔ Mapo Bridge
(5) Wonhyo Bridge ↔ Dongjak Bridge
(6) Banpo Bridge ↔ Dongho Bridge
(7) Sungsoo Bridge ↔ Chungdam Bridge
(8) Jamsil Bridge ↔ Chunho Bridge (c)

「North Riverside Road」

Haengjoo Wonhyo Dongho Chunho

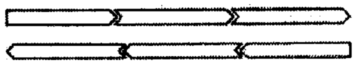

Haengjoo IC
70Km ▽ △ 79Km

World Cup Stadium entrance
70Km ▽ ▲ 20Km

Mapo Bridge
30Km ▼ △ 70Km

Hannam Bridge
70Km ▽ ▲ 38Km

Chungdam Bridge
70Km ▽ △ 79Km (d)

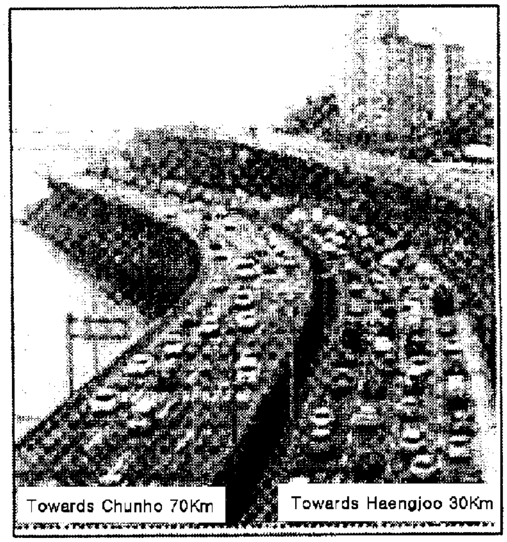

[Fig. 6]
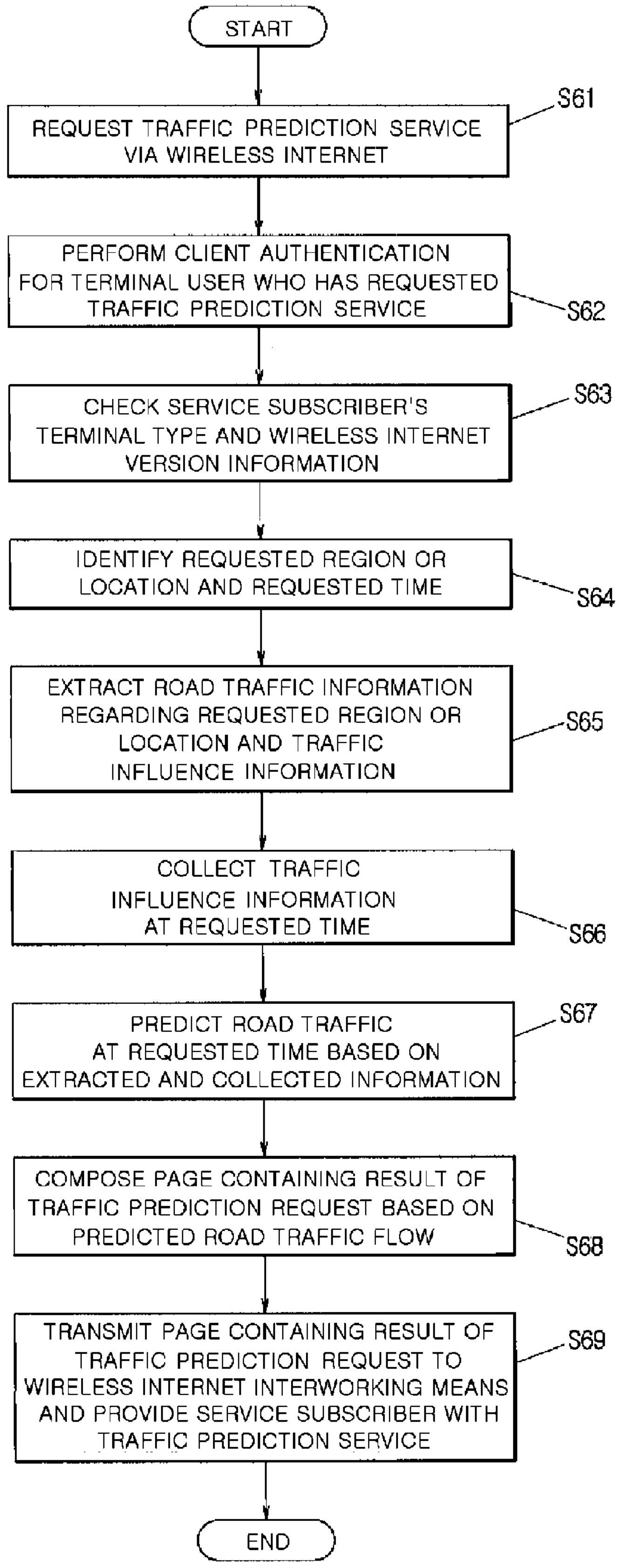

[Fig. 7]
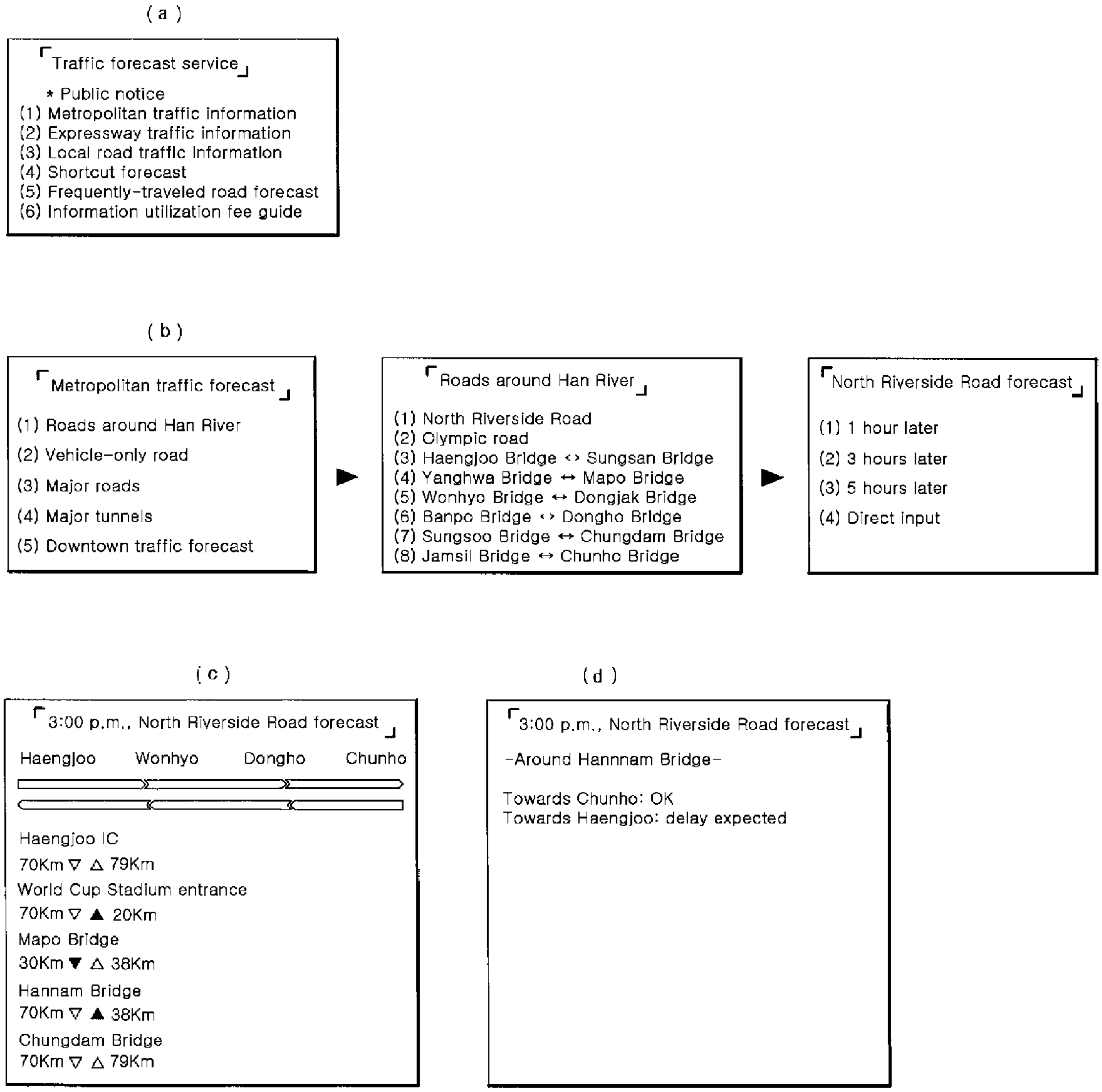

[Fig. 8]
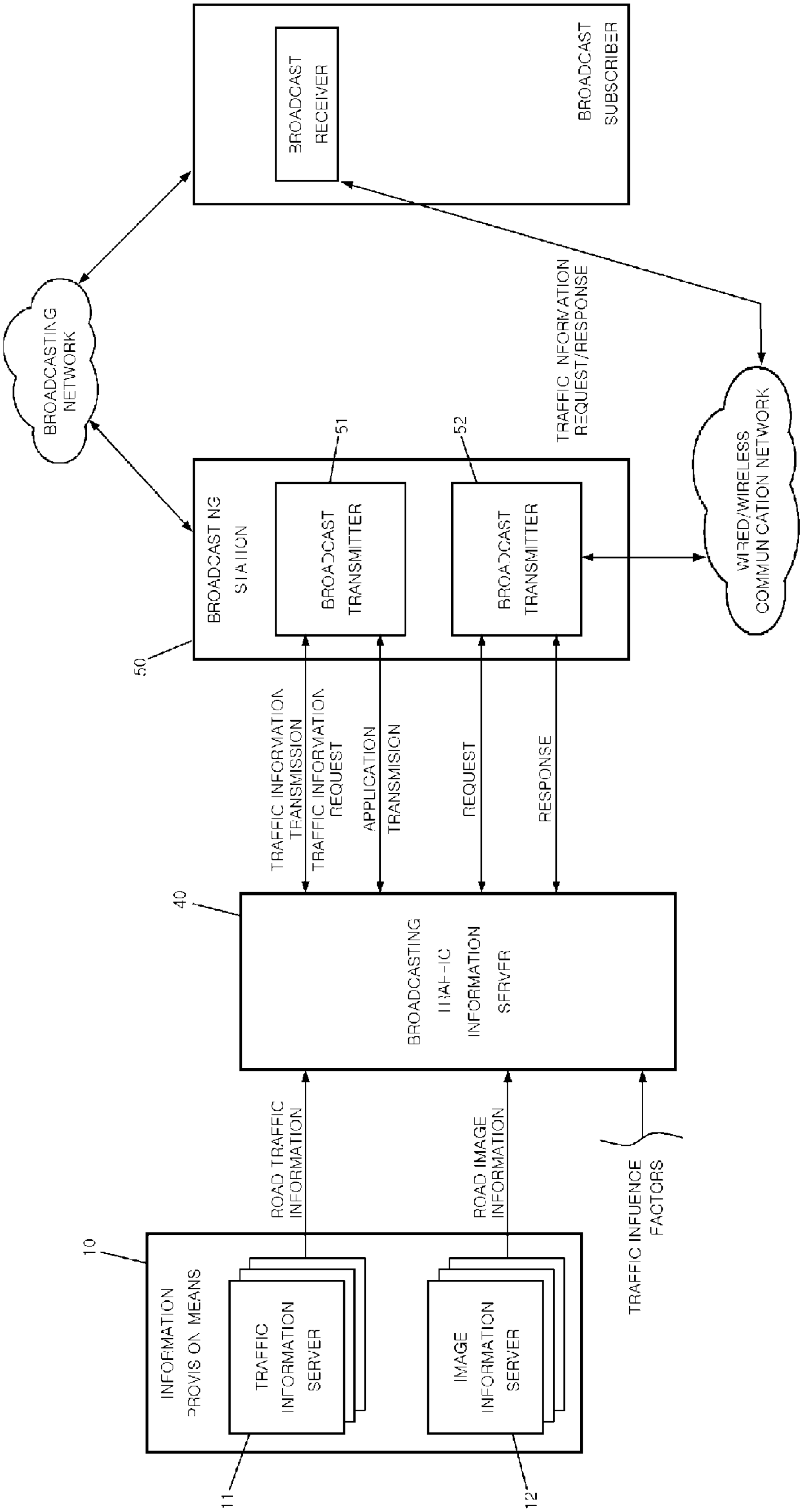

[Fig. 9]
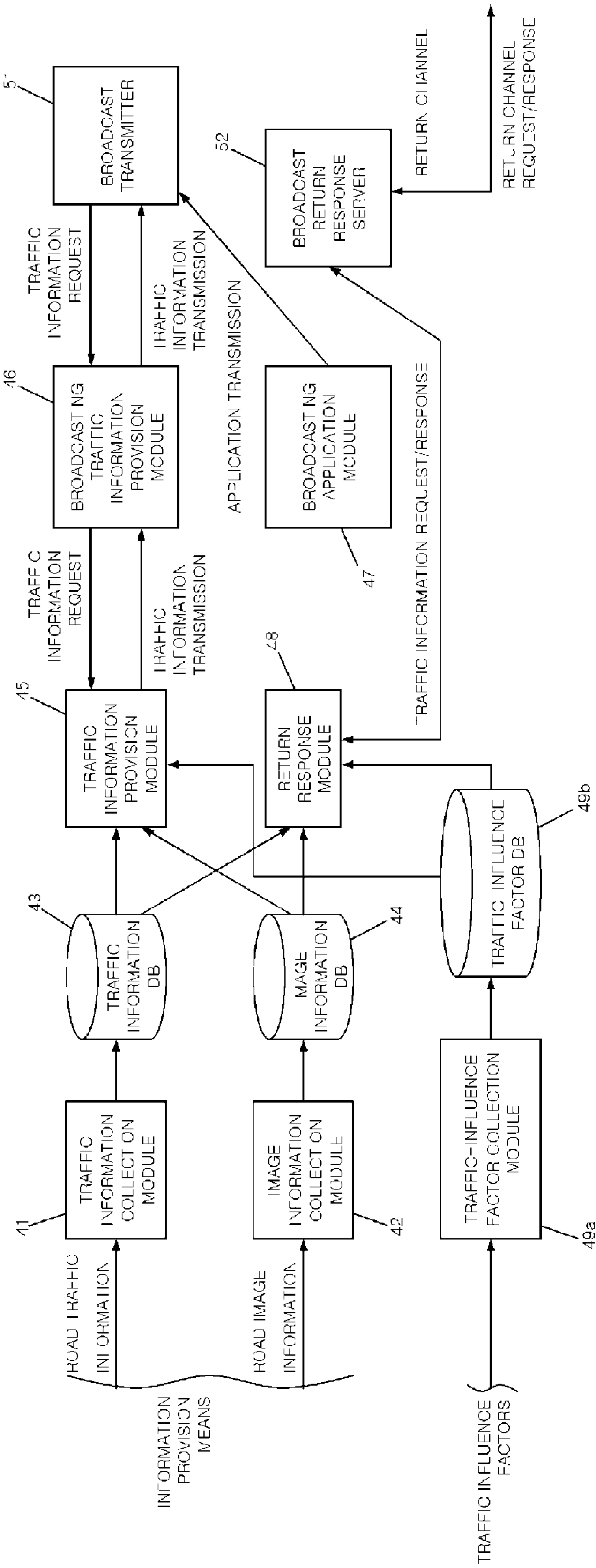

[Fig. 10]
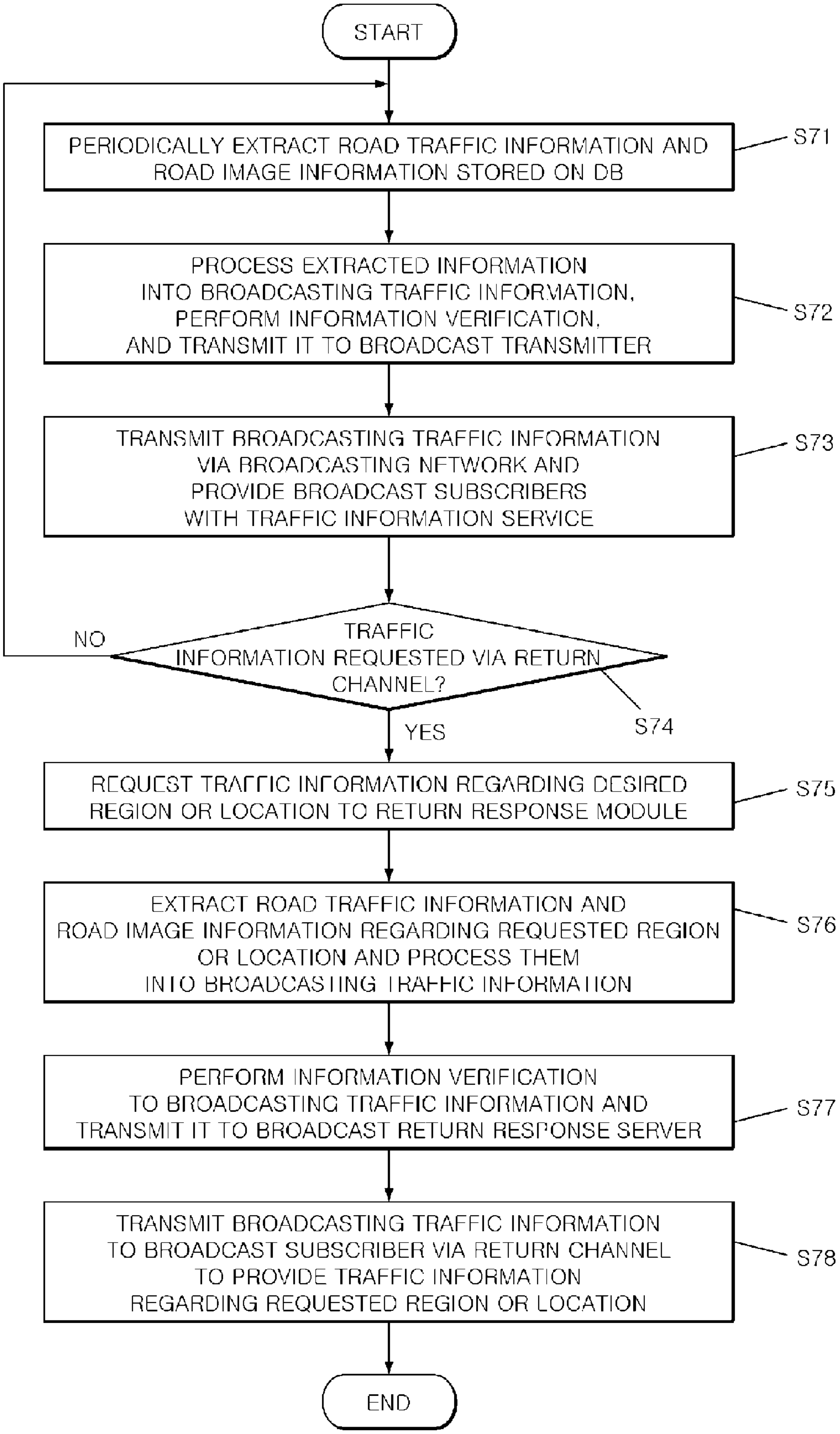

[Fig. 11]
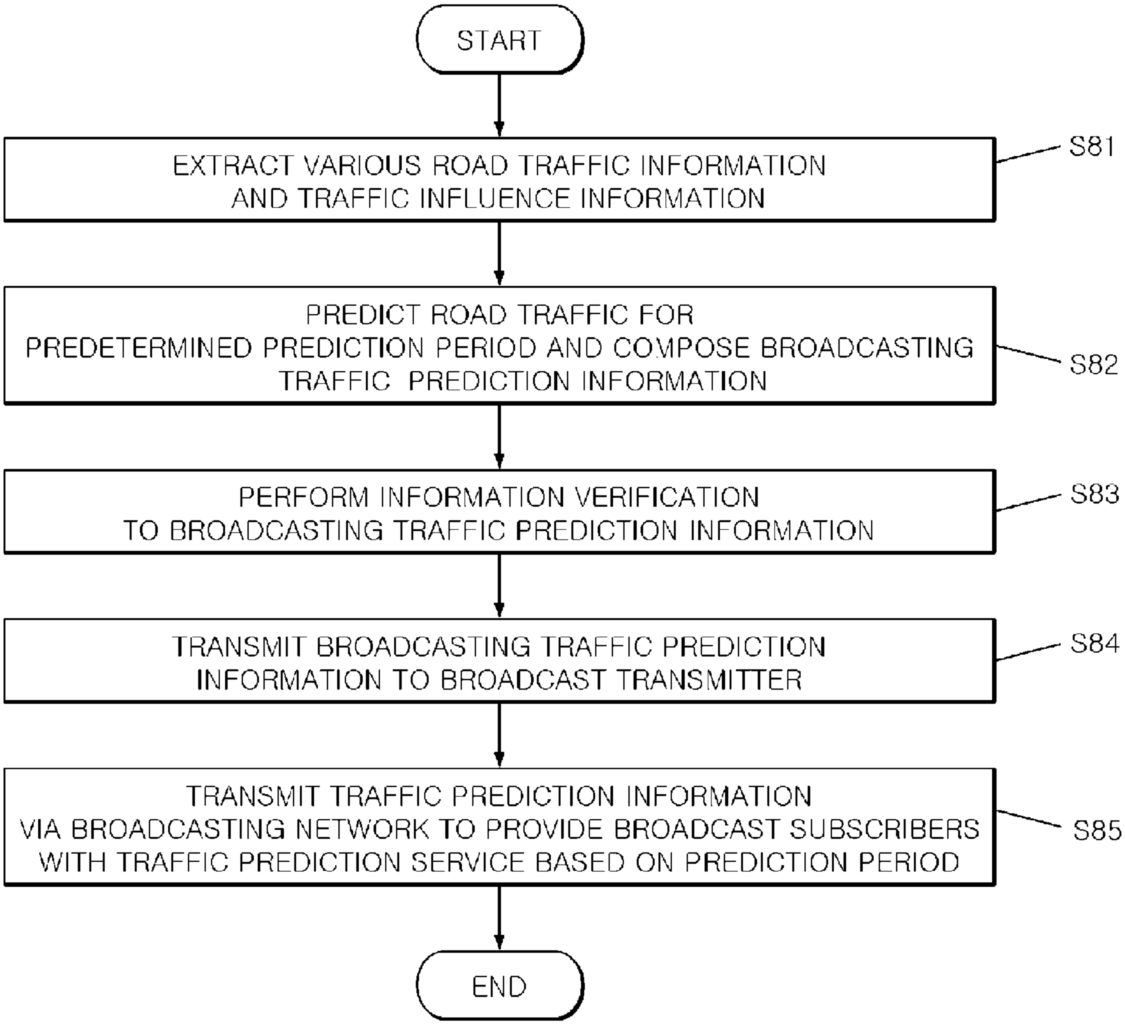

[Fig. 12]
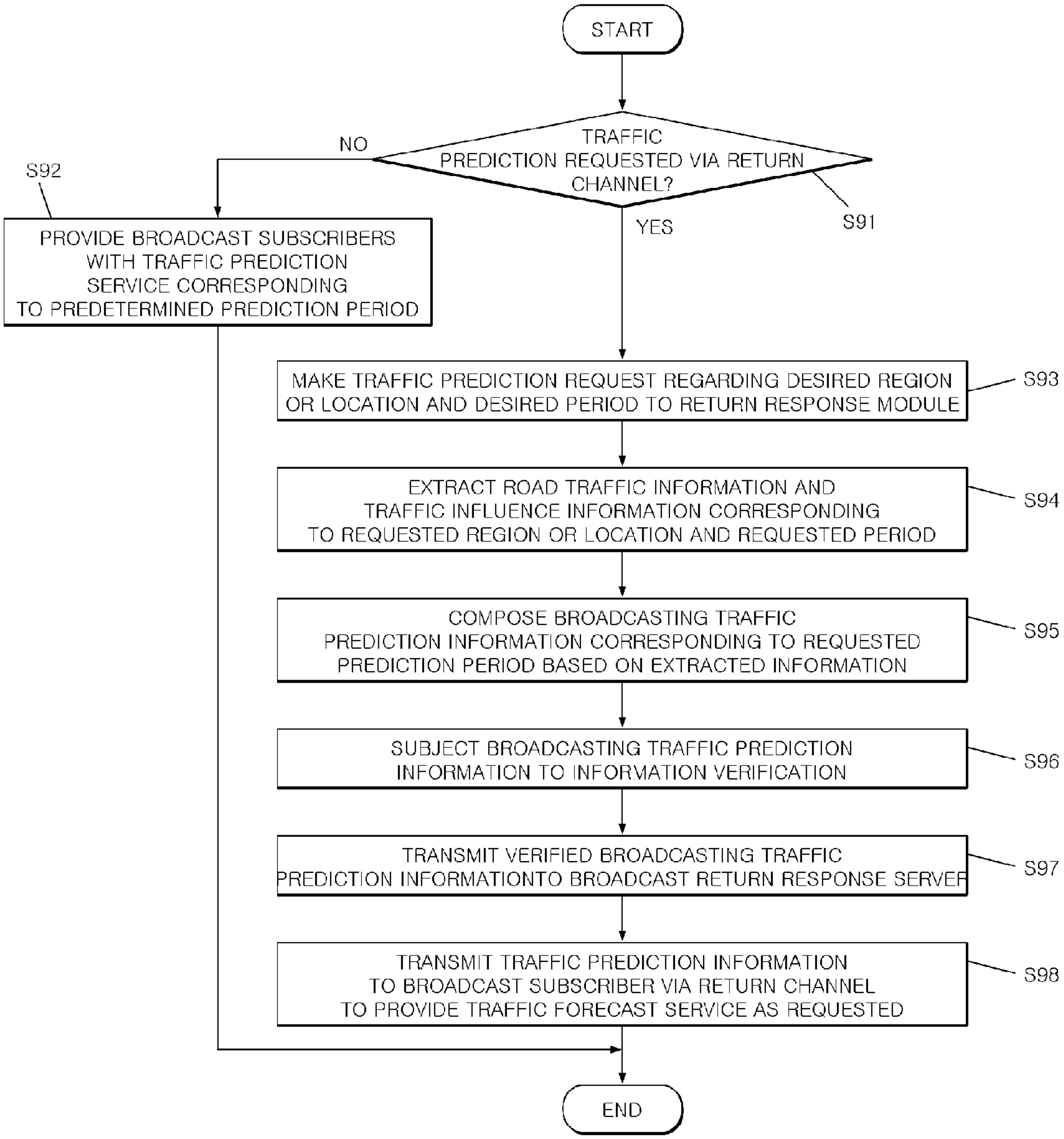
[Fig. 13]
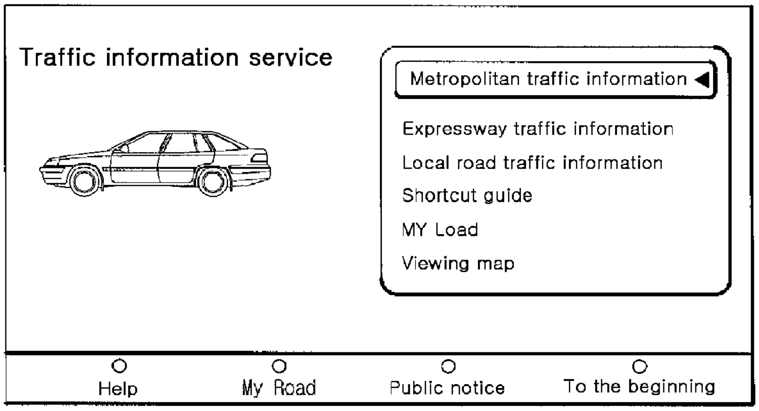

[Fig. 14]
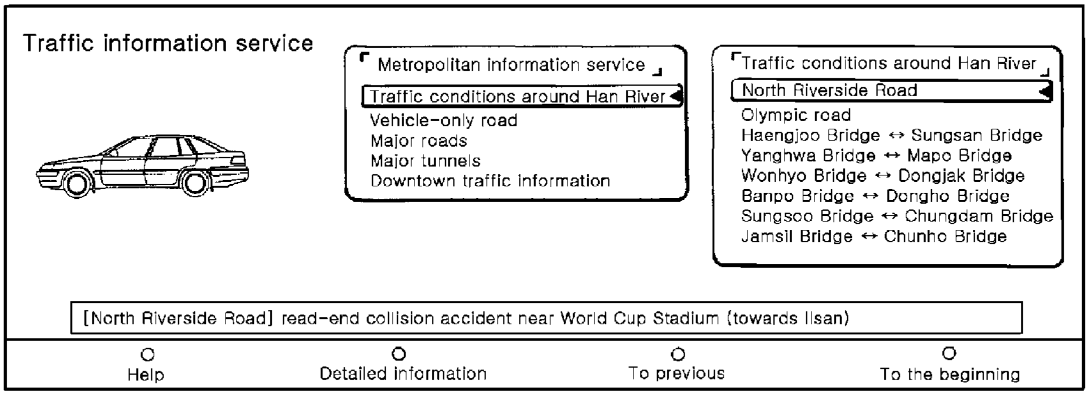
[Fig. 15]
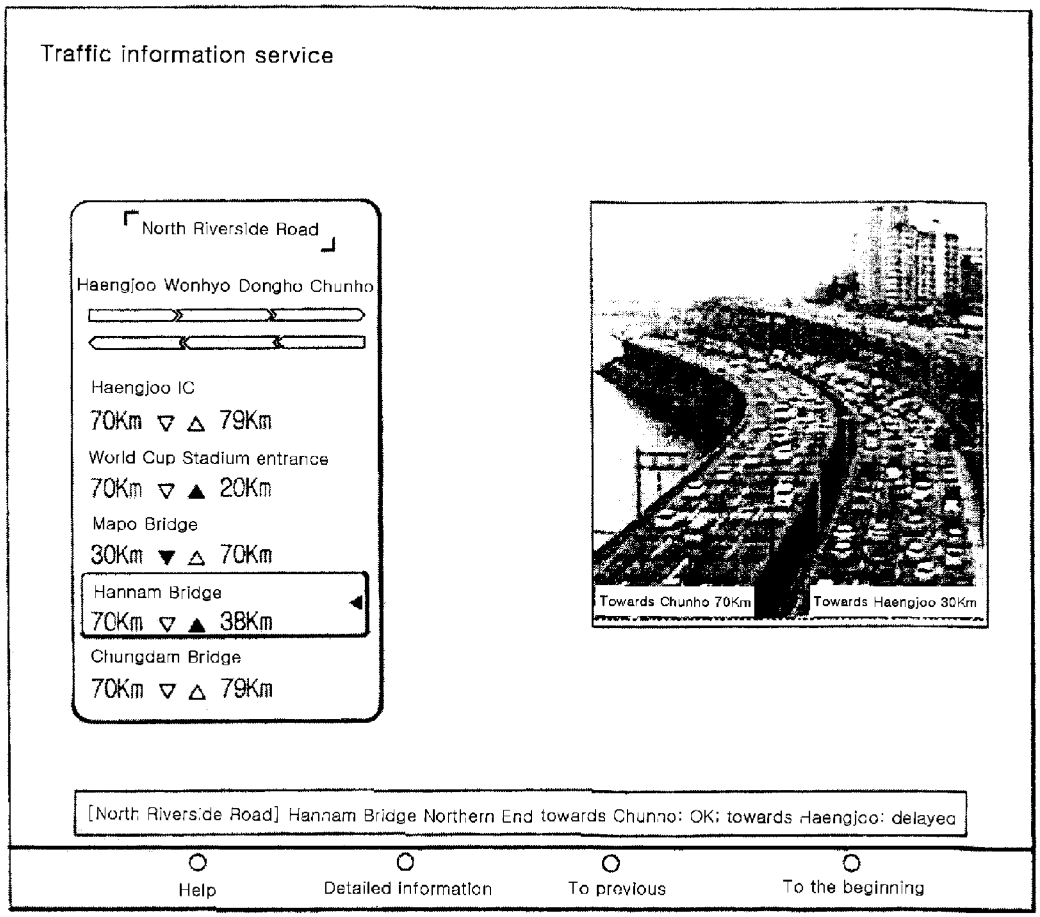

[Fig. 16]
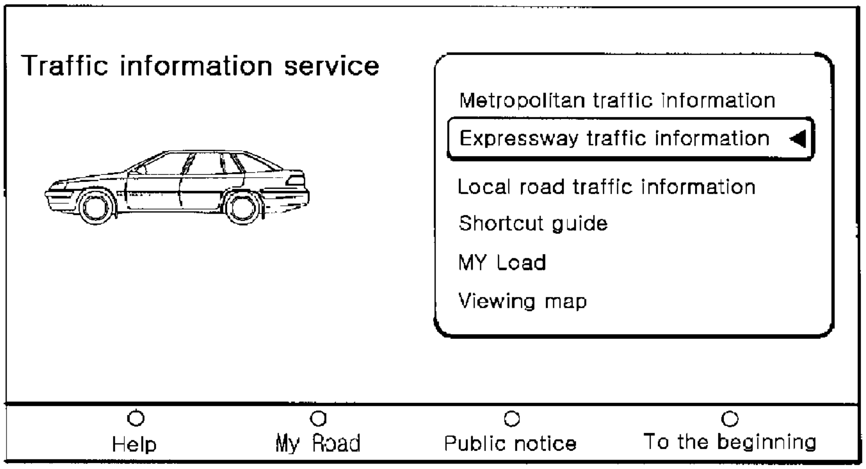
[Fig. 17]
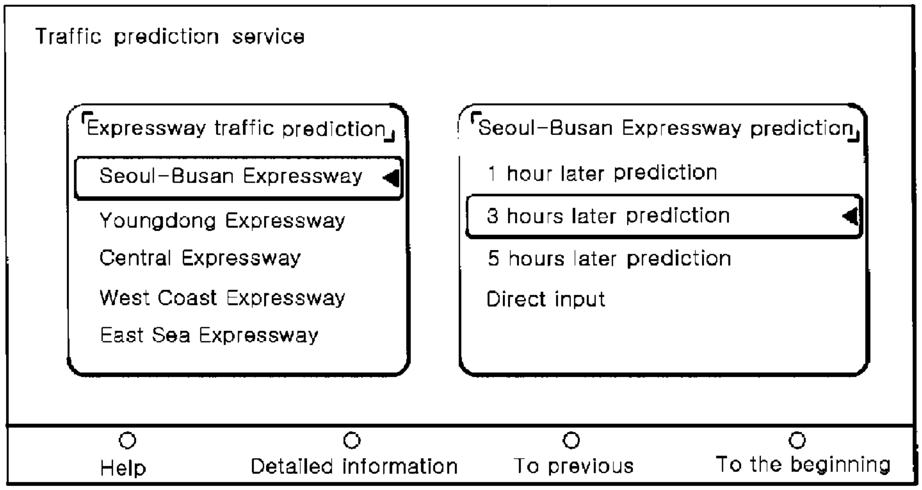
[Fig. 18]
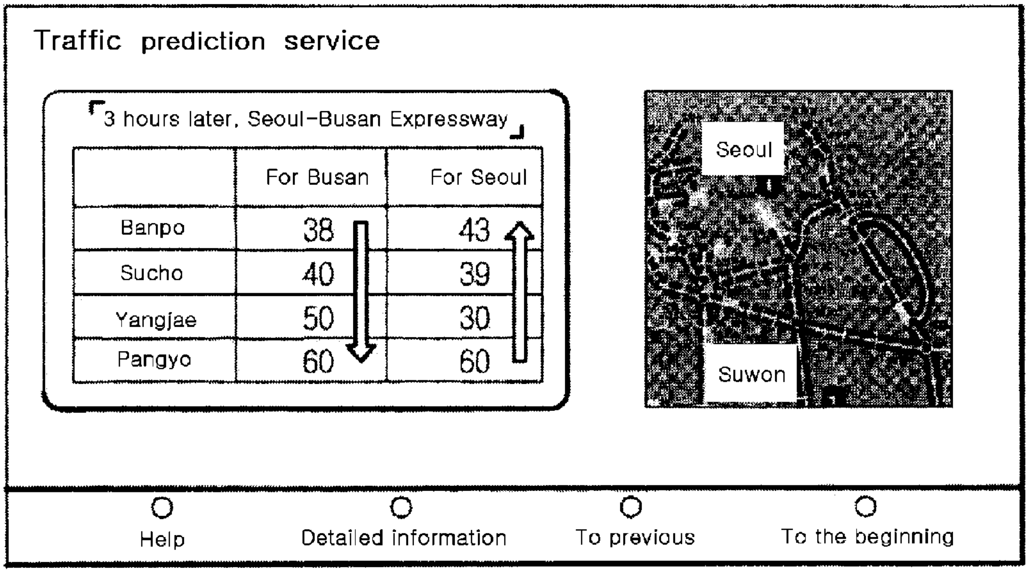

[Fig. 19]
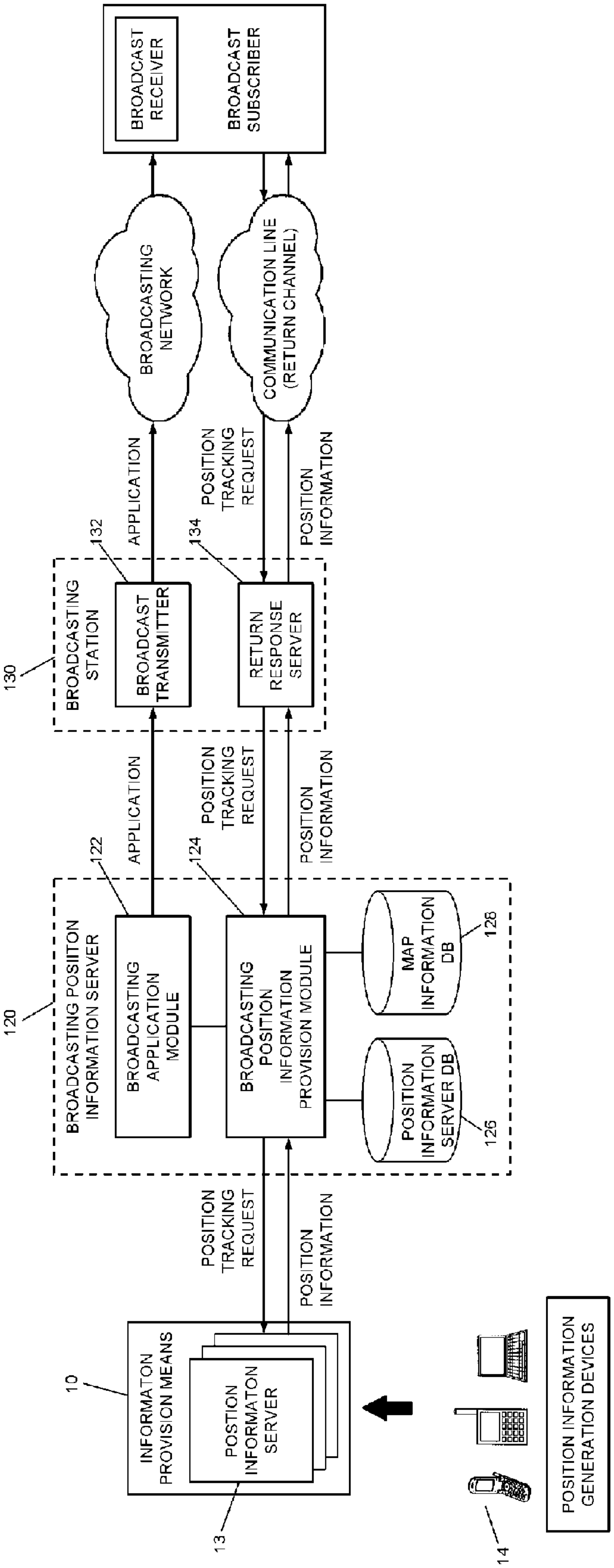

[Fig. 20]
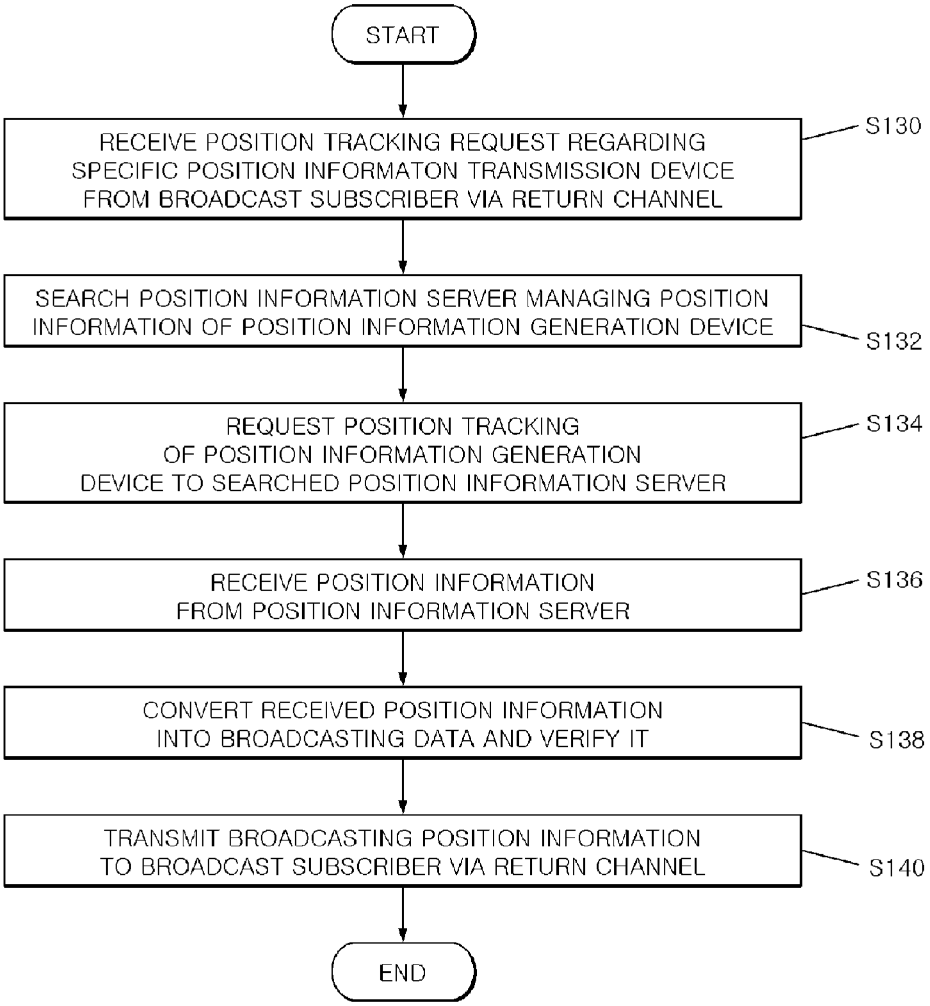
[Fig. 21]
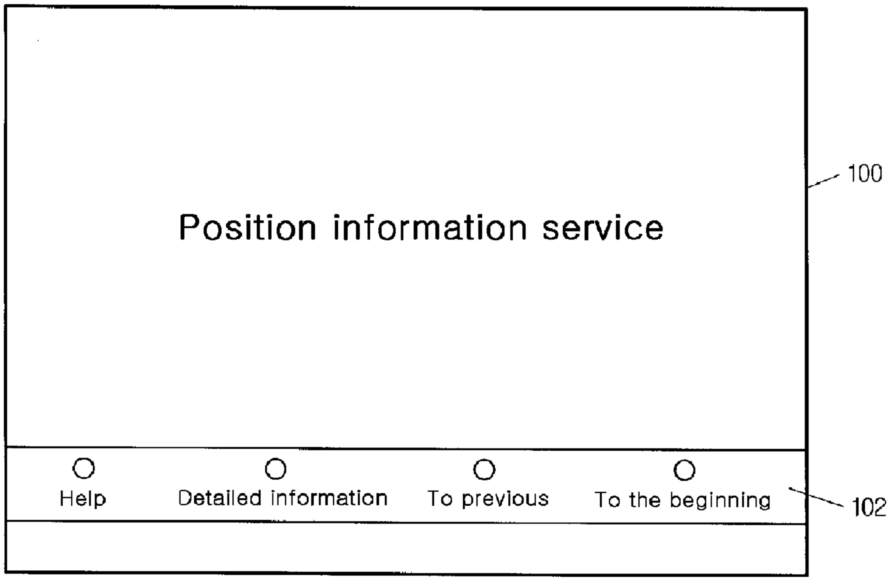

[Fig. 22]
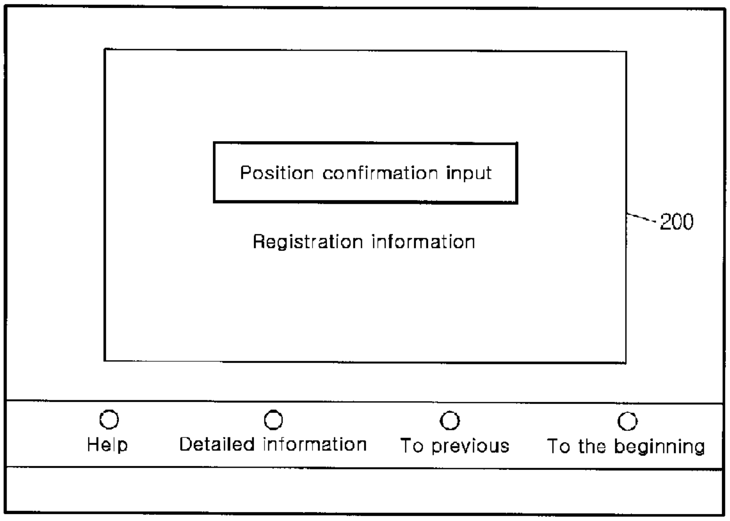
[Fig. 23]
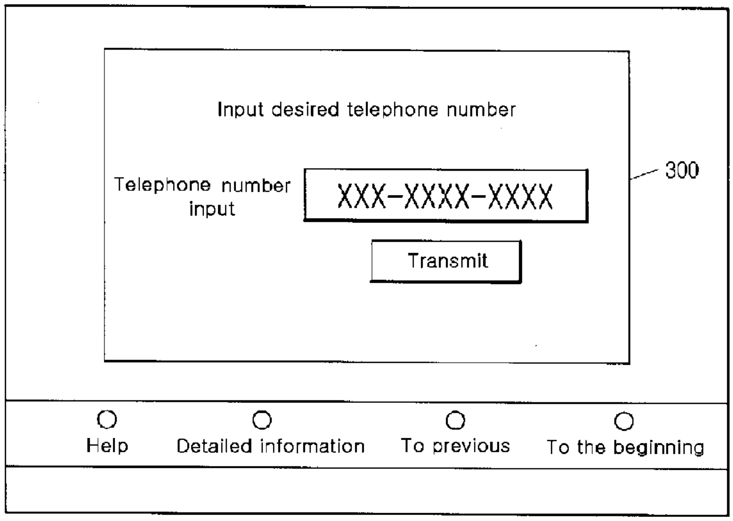
[Fig. 24]
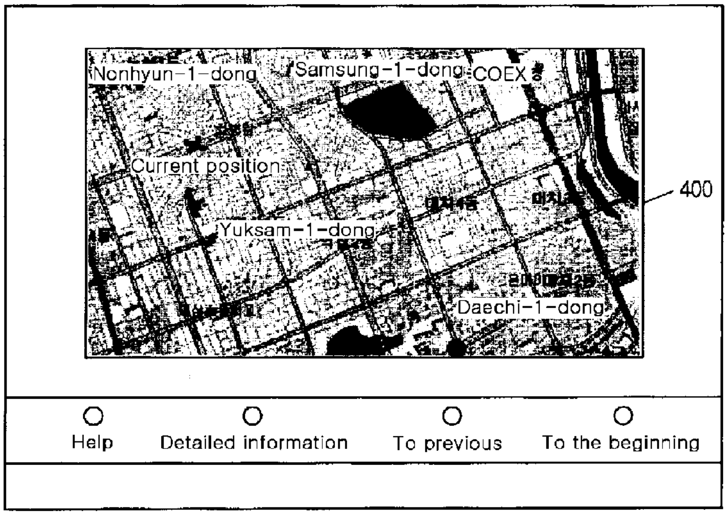

SYSTEM AND METHOD FOR INFORMATION SUPPLYING SERVICE

TECHNICAL FIELD

The present invention relates to a system and a method for an information provision service. More particularly, the present invention relates to a system and a method for providing service subscribers with a series of information by interworking with information provision means, collecting various traffic-related information, position information, etc., and processing it so as to be suitable for various information transmission means.

BACKGROUND ART

Recently, rapid increase in traffic demands causes traffic congestion and economic loss (e.g. loss of energy) due to poor distribution of products. Furthermore, in spite of such traffic congestion, an increasing number of vehicle drivers violate traffic regulations (e.g. regulations related to speeding, signals, or lanes), in order to reach their destination quickly. The resulting increase in traffic accidents has become another social problem.

In order to solve such problems, new roads must be constructed in accordance with the increase in traffic demands. However, constructing new roads needs a vast amount of funding and time, and there are many practical difficulties.

As an alternative approach, various service methods for providing vehicle drivers with a series of traffic information regarding road traffic conditions have been proposed, including a method using a radio broadcasting system, a method using a text message call service system, a method using large display boards, and a method using a vehicle navigation system.

Although the method using a radio broadcasting system can provide vehicle drivers with substantially real-time information on traffic congestion, users of that traffic information service cannot be provided with traffic information regarding a desired region at a desired time, because traffic information is transmitted in a predetermined order by a broadcasting station, and even the traffic information is related to limited regions (e.g. specific expressways or highways).

The method using a text message call service system can provide users of that traffic information service with traffic information regarding a desired region at a desired time. However, it is difficult to provide accurate and detailed traffic information in a text message call mode. The method using large display boards as means for providing traffic information has a problem in that, since the large display boards are fixed at predetermined locations, the range of provision of traffic information is spatially limited and vehicle drivers cannot be provided with desired traffic information.

The method using a vehicle navigation system has been proposed to overcome the problems of the above-mentioned traffic information service methods. The method uses a CNS (car navigation system), which interwork with a DRM (digital road map), GPS (global positioning system) module, and a navigation system, all of which are installed on terminals inside vehicles, to provide traffic information. The current location of each vehicle is displayed on the terminal using the DRM. If necessary, the shortest or optimal path can be calculated to guide the vehicle diver to the destination. In addition, real-time traffic information is received via a communication network for convenient driving environment.

However, conventional methods for providing a traffic information service using a CNS have a problem in that the service is solely provided to vehicle drivers having a GPS module and a car navigation device or users of a mobile communication terminal who have subscribed to a specific traffic information service. In addition, detailed traffic information regarding a specific region or location cannot be provided on a nationwide scale, because traffic information can solely be collected or received via vehicles equipped with a car navigation device or via mobile communication terminals. This makes it difficult to accurately grasp the current traffic.

Furthermore, the above-mentioned conventional traffic information service methods cannot predict the traffic at a specific point of time in the future, although they can provide traffic information regarding a specific region or location at the current point of time and information on expected time to be taken before arrival or on the optimal path to the destination. Therefore, service subscribers cannot forecast future traffic flow and properly cope with it.

Meanwhile, as communication technology develops and wireless network infrastructure is reinforced, portable communication terminals including portable telephones, PDAs (personal digital assistants), and laptop computers are increasingly used. The portable communication terminals, which must always have guaranteed access to a wireless communication network, frequently transmit wireless signals for reporting their position information so that they can be managed within service regions. Particularly, information on the position of a device, which transmits position information, is managed in real time by a position information server corresponding to the terminal so that, based on the information, the position of a movable body (e.g. a person or object) can be tracked.

Position information servers for managing position information use PDT (position determination technology) for grasping the position of mobile communication terminals, network-based technology using base station reception signals, GPS using satellites, or cell search technology, according to the characteristics of position information generation devices to be managed by the servers.

In this regard, means for providing services related to wireless networks incorporate a position tracking function for locating an object, which carries a position information generation device, as an additional service function. This function can be used for various purposes including locating a missing child, guiding a group of persons, and managing staff, vehicle services, or distribution of products.

However, in the case of conventional position information services, there is a problem in that, since respective position information servers provide position information only to position information generation devices under their management, a user, who needs position tracking, must access each position information server, which corresponds to the type of position tracking transmission device carried by himself, to request position tracking.

In addition, in the case of conventional position information provision services, the information provision path is limited to wired/wireless Internet. This means that, when a user needs position tracking, he must use a medium which enables wired or wireless Internet access, such as a portable telephone, a PDA, a dedicated terminal, or a PC, in order to request position tracking and receive position information. It is inconvenient to carry a separate wired/wireless Internet access medium all the time and access a site or home page, which provides the corresponding service, to receive the service.

DISCLOSURE OF INVENTION

Technical Problem

Therefore, the present invention has been made in view of the above-mentioned problems, and it is an object of the present invention to provide a system and a method for collecting, accumulating, and managing various road traffic information, road image information, and road traffic influence information, all of which are collected and managed by information provision means, so that service subscribers are provided with traffic-related information.

It is another object of the present invention to provide a system and a method for accessing traffic information stored in a DB, when a service subscriber requests traffic-related information, and providing him with customized traffic information regarding a requested region or location so that service subscribers are provided with a detailed traffic information service regarding a specific region or location on a nationwide scale.

It is another object of the present invention to provide a system and a method for collecting, accumulating, and managing various road traffic information and road traffic influence information, all of which are collected and managed by information provision means, so that future traffic can be predicted based on the above information.

It is another object of the present invention to provide a system and a method for forecasting future traffic, when a service subscriber requests a traffic prediction, composing a page, which contains the result of the traffic prediction request, so as to be suitable for information transmission means, and transmitting the page to the service subscriber so that a traffic prediction service, including prediction information regarding future traffic of a specific region or location, can be provided.

It is another object of the present invention to provide a system and a method for receiving position information of a position information generation device carried by an object, the position of which is to be tracked, from a server which manages the position information of the device and providing a service subscriber, who has requested position tracking, with position information of the device.

Technical Solution

According to an aspect of the present invention, there is provided an information provision service system including an information provision means for collecting and managing at least one of road traffic information, road image information, and position information; an information transmission means for providing a subscriber terminal using a communication service with the communication service; and an information processing means for collecting at least one of the road traffic information, the road image information, the position information, and road traffic influence information while interworking with the information provision means, storing collected information on corresponding DBs, managing stored information, wherein the information processing means perform function of processing the road traffic information and the road image information stored on the DBs to be conformed to a transmission type of the communication service in response to a traffic information request of the subscriber terminal, and transmitting processed information to the subscriber terminal via the information transmission means, function of predicting traffic of requested location and time based on the road traffic information and the road traffic influence information stored on the DBs in response to a traffic prediction request of the subscriber terminal, processing the predicted traffic into the transmission type of the communication service, processing the traffic prediction information to be conformed to the transmission type of the communication service, and transmitting the traffic prediction information to the subscriber terminal via the information transmission means, or function of processing the position information stored on the DB and map information corresponding to the position information to be conformed to the transmission type of the communication service in response to a position tracking request of the subscriber terminal, and transmitting processed position information to the subscriber terminal via the information transmission means.

The information processing means includes a traffic information collection module for collecting the road traffic information collected and managed by the information provision means while interworking with the information provision means, classifying collected road traffic information based on region or location, storing classified road traffic information in a traffic information DB, and managing stored road traffic information; an image information collection module for collecting the road image information collected and managed by the information provision means while interworking with the information provision means, classifying collected road image information and managing stored road image information; a traffic influence factor collection module for collecting the traffic influence information at a point of time of collection of the road traffic information or at a predetermined cycle, storing collected information in a traffic influence factor DB, and managing stored information; and an information provision module for extracting information from at least one of the traffic information DB, the image information DB and the traffic influence factor DB, processing the extracted information to be conformed to the transmission type of the communication service in response to a request of the subscriber terminal, and transmitting the processed information to the subscriber terminal.

When the information transmission means is a broadcasting station and the subscriber terminal is a broadcast receiver, the information processing means comprises a broadcasting information provision module for performing function of processing the road traffic information, the road image information, and the traffic influence information transmitted from the information provision module for broadcasting, performing at least one information verification of data, update cycle, vehicle speed and time, transmitting verified information to a broadcast transmitter of the broadcasting station, and providing the subscriber terminal with real-time traffic information and traffic prediction information, and function of processing broadcasting position information using map information corresponding to the position information of the position information generation device, verifying format and displacement of the broadcasting position information, transmitting verified information to the broadcast transmitter, and providing the subscriber terminal with broadcasting-based position information; and a broadcasting application module for transmitting an application for screen display to the broadcast transmitter of the broadcasting station when providing the subscriber terminal with the broadcasting-based real-time traffic information, the traffic prediction, and the position information.

The information provision service system further includes a return response module for analyzing a request of the traffic information and the traffic prediction made by the subscriber terminal via a return channel connected to the information transmission means, extracting necessary information from the traffic information DB, the image information DB, and the traffic influence factor DB, processing extracted information into broadcasting traffic information and traffic prediction, performing a series of information verification, and transmitting the broadcasting traffic information and traffic prediction to the information transmission means.

In accordance with another aspect of the present invention, there is provided a information provision service method for providing information in an information provision service system including an information provision means for collecting and managing road traffic information, road image information, and position information for tracking, a subscriber terminal using a communication service, an information transmission means for providing the subscriber terminal with the communication service, and an information processing means for providing the subscriber terminal with information collected by the information provision means via the information transmission means, the method comprising the steps of: collecting the road traffic information, the road image information, the position information, and traffic influence information while interworking with the information provision means and storing collected information on corresponding DBs; processing the road traffic information and the road image information stored on the DBs to be conformed to a transmission type of the communication service in response to a traffic information request of the subscriber terminal and transmitting processed information to the subscriber terminal via the information transmission means; predicting traffic of requested place and time based on the road traffic information and the traffic influence information stored on the DBs in response to a traffic prediction request of the subscriber terminal, processing predicted traffic into traffic prediction information to be conformed to the transmission type of the communication service, and transmitting the traffic prediction information to the subscriber terminal via the information transmission means; and processing position information to be conformed to the transmission type of the communication service using the position information stored on the DB and map information corresponding to the position information in response to a position tracking request of the subscriber terminal and transmitting processed position information to the subscriber terminal via the information transmission means.

The step of collecting information includes the steps of collecting the road traffic information, the road image information, the position information, and the road traffic influence information by the information processing means while interworking with the information provision means according to a predetermined information collection schedule; and classifying collected information based on region or location, storing classified information on corresponding DBs according to information type, and managing stored information.

The step of transmitting the traffic information, traffic prediction information, and position information includes the steps of referring to subscriber authentication information by the information processing means, when the subscriber terminal requests the traffic information, the traffic prediction, and the position information via the information transmission means, and performing client authentication for the subscriber terminal; identifying communication environment, terminal type, and terminal browser information of the subscriber terminal after the subscriber terminal is confirmed to be a valid subscriber terminal; analyzing the traffic information, the traffic prediction, and the position information requested from the subscriber terminal, identifying a request type of the subscriber terminal, and extracting corresponding information from the DBs; and analyzing extracted information, processing analyzed information to be conformed to the communication environment, the terminal type, and terminal browser information of the subscriber terminal, and composing an information request result page.

When the information transmission means is a broadcasting station and the subscriber terminal is a broadcast receiver, the method further includes the steps of checking whether or not there is a request of the traffic information and the traffic prediction from the subscriber terminal via a return channel connected to the information transmission means; analyzing the request, when there is the request, and extracting road traffic information, road image information, and road traffic influence information from corresponding DBs according to the request; processing extracted road traffic information and road image information into broadcasting traffic information and traffic prediction and performing a series of information verification; and transmitting verified broadcasting traffic information and traffic prediction to the subscriber terminal via the return channel.

The system and method according to the present invention collect text-type road traffic information and road image information, which are collected and managed by information provision means, classify them based on region or location, manage them, extract the text-type traffic information and road image information in response to a traffic information request of a service subscriber, compose a traffic information request result page suitable for wireless Internet, and transmits it. In this manner, service subscribers are provided with a detailed traffic information service regarding a specific region or location based on wireless Internet on a nationwide scale, with no economical burden (e.g. purchasing an expensive car navigation device or paying additional satellite utilization fee).

In addition, the system and method collect various road traffic information and road traffic influence information, accumulate them, manage them, predict future traffic based on the accumulated road traffic information and traffic influence information in response to a traffic prediction request of a service subscriber, compose a traffic prediction request result page suitable for wireless Internet, and provide the service subscriber with it. Such provision of a traffic prediction service including prediction information regarding future traffic based on wireless Internet enables service subscribers to predict future traffic of a specific region or location and properly deal with it.

The inventive system and method collect road traffic information and road image information while interworking with information provision means, classify them on DBs based on region or location, manage them, process the road traffic information and road image information so as to be suitable for broadcasting, perform speed and time verification of the traffic information, and transmit it to a broadcast transmitter, so that broadcasting subscribers are provided with collected traffic information in real time.

When a broadcast subscriber makes a traffic information request via a return channel, the system and method access traffic information stored in DBs, compose traffic information regarding the requested region or location, and transmit the traffic information to the subscriber via the return channel, so that the broadcast subscriber, who has made the request, is provided with a broadcasting-based detailed traffic information service regarding a specific region or location on a nationwide scale.

Furthermore, the inventive system and method collect various road traffic information and road traffic influence information, accumulate them, manage them, predict future traffic based on the road traffic information and road traffic influence information, compose traffic prediction information suitable for broadcasting, and transmit it to the broadcast transmitter, in order to provide various traffic prediction services informing future road traffic regarding a specific region or location based on broadcasting.

When a broadcast subscriber makes a traffic prediction request via the return channel, the system and method compose broadcasting traffic prediction information regarding a requested region or location for a requested period and transmit it via the return channel. As a result, the broadcast subscriber, who has made the request, is provided with a broadcasting-based traffic prediction service informing road traffic of the requested region or location for the requested period, so that he can predict future road traffic and properly deal with it.

When a broadcast subscriber requests position tracking of a specific object via the return channel, the system and method receive position information from a server managing position information of the position information generation device carried by the object, the position of which is to be tracked, and display the current position of the object on the screen of the broadcast receiver of the broadcast subscriber. In this manner, position information of various position information generation devices is provided via the broadcast receiver of the broadcast subscriber.

BRIEF DESCRIPTION OF THE DRAWINGS

The foregoing and other objects, features, and advantages of the present invention will become more apparent from the following detailed description when taken in conjunction with the accompanying drawings in which:

FIG. 1 shows the construction of an information provision service system according to the present invention;

FIG. 2 shows the construction of a wireless Internet traffic information server 20;

FIG. 3 is a flowchart showing steps for collecting and storing information in a traffic information service system using wireless Internet according to the present invention;

FIG. 4 is a flowchart showing a series of steps for providing a traffic information service in a traffic information service system using wireless Internet according to the present invention;

FIG. 5 shows an example of a service menu and pages, which contain a service request and its result, respectively, for providing a traffic information service using wireless Internet according to the present invention;

FIG. 6 is a flowchart showing a series of steps for providing a traffic prediction service in a traffic prediction service system using wireless Internet according to the present invention;

FIG. 7 shows an example of a service menu and pages, which contain a service request and its result, respectively, for providing a traffic prediction service using wireless Internet according to the present invention;

FIG. 8 shows the construction of a traffic-related information service system according to the present invention;

FIG. 9 shows the construction of a broadcasting traffic information server 40;

FIG. 10 is a flowchart showing a series of steps for providing a traffic information service in a traffic-related information service system using broadcasting according to the present invention;

FIG. 11 is a flowchart showing a series of steps for providing a traffic prediction service in a traffic-related information service system using broadcasting according to the present invention;

FIG. 12 is a flowchart showing a series of steps for providing a traffic prediction service, when a broadcast subscriber requests a traffic prediction information, in a traffic-related information service system using broadcasting according to the present invention;

FIGS. 13 to 15 show examples of a service screen, a service request screen, and a result screen for providing a traffic information service using broadcasting according to the present invention;

FIGS. 16 to 18 show examples of a service screen, a service request screen, and a result screen, respectively, for providing a traffic prediction service using broadcasting according to the present invention;

FIG. 19 shows the construction of a position information provision service system according to the present invention;

FIG. 20 is a flowchart showing a position information service method in a position information service system using broadcasting according to the present invention; and FIGS. 21 to 24 show examples of service screens for providing a position information service using broadcasting according to the present invention.

BEST MODE FOR CARRYING OUT THE INVENTION

Reference will now be made in detail to the preferred embodiments of the present invention.

An information provision service system according to the present invention, which has a construction as shown in FIG. 1, interworks with a series of information provision means, collects various traffic-related information, position information, etc., and processes the information so as to be suitable for various information transmission means, so that service subscribers are provided with a series of information in real time.

In particular, the information provision service system according to the present invention includes an information provision means (or unit) 10 for providing various traffic-related information and position information; an information processing means (or unit) 20 for interworking with the information provision means 10, collecting various traffic-related information and position information, storing the information on a corresponding DB, managing the information, processing the information stored in the DB at a service subscriber's request, and transmitting the information to the service subscriber; and an information transmission means (or unit) 30 for transmitting an information request and its result between the information processing means 20 and the service subscriber.

The information provision means 10, as shown in FIG. 1, includes a traffic information server 11 for collecting, storing, and managing a series of information, including vehicle speed and traffic density measured from speed measuring devices and traffic density detectors installed in predetermined regions or locations of various roads across the nation (e.g. expressways, highways, local roads, or urban roads); an image information server 12 for collecting, storing, and managing a series of road image information from vehicle-monitoring CCTVs and CCD cameras installed on various roads, as in the case of the traffic information server 11; and a position information server 13 for receiving signals transmitted from position information generation devices (not shown) carried by objects, the position of which is to be tracked, storing information on the current position of the respective position information generation devices, and managing the information. The position information generation devices may be any of various media, including portable telephones, PDAs, laptop computers, GPS transmission devices, and RF transmission devices. The position information server, which manages information on the position of the position information generation devices, may be a home-position register for a mobile communication system, a GPS system, or an RF wireless processing device, depending on the type of the position information generation devices.

In addition to traffic-related information and position information, the information processing means 20 collects information on factors affecting traffic. This is for the purpose of forecasting future traffic information based on analysis of the traffic influence factors, in addition to past and current traffic information.

The construction of the information processing means 20 and the information transmission means 30 may be varied depending on the type of information transmission technology. The information transmission means may be any of wireless Internet, satellite broadcasting, DMB (digital multimedia broadcasting), and cable data broadcasting. Service subscribers can use any type of information transmission means to be provided with traffic-related information and position information.

MODE FOR THE INVENTION

Detailed construction of the information processing means 20 and the information transmission means 30 will now be described with reference to respective embodiments of the information transmission means.

A first embodiment of the information transmission means, when it is wireless Internet, will now be described. The first embodiment relates to a system and a method for a service of providing service subscribers, who use mobile communication terminals incorporating wireless Internet function, with traffic-related information. For easier understanding, the information processing means 20 will hereinafter be referred to as a wireless Internet traffic information server 20, and the information transmission means 30 as a wireless Internet interworking means (or unit) 30 (reference numerals remain unchanged).

The wireless Internet traffic information server 20, as shown in FIG. 2, includes a traffic information collection module 21; an image information collection module 22, both of which interwork with the information provision means 10; a traffic influence factor collection module 27 for collecting information on factors affecting traffic; a traffic information DB 23 for accumulating and storing information collected by the collection modules 21, 22, and 27; an image information DB 24; a traffic influence factor DB 28; a traffic information provision module 25; and a client information DB 26 for storing various information, including authentication information on service subscribers, traffic information service particulars, subscriber communication environment, subscriber terminal type, and terminal browser version information.

The traffic information collection module 21 interworks with various traffic information servers 11, which act as information provision servers 10; collects a series of road traffic information, which is collected and managed by the traffic information servers 11; classifies the information based on region or location; tabulates the information according to the type; and stores the information on the traffic information DB 23.

The image information collection module 22 interworks with various image information servers 12, which act as information provision means 10; collects a series of road image information (for example, JPG images), which is collected and managed by the image information servers 12; classifies the information based on region or location; tabulates the information according to the type; and stores the information on the image information DB 24.

The traffic influence factor collection module 27 collects information on factors affecting road traffic, based on road traffic information collected by the traffic information collection module 21. More particularly, the traffic influence factor collection module 27 collects information on external factors, which affect road traffic in a predetermined region or location when the traffic information collection module 21 collects road traffic information, at the same point of time as that of the collection of road traffic information by the traffic information collection module 21, as well as at a predetermined cycle, based on the characteristics. The factors include weather, date, day, time, holidays, consecutive holidays, events, gatherings, construction, and roadside facilities (e.g. schools, educational institutes, sport stadiums, amusement centers, tourist attractions, department stores, discount stores, markets, terminals, or stations). Then, the traffic influence factor collection module 27 stores the collected information in the traffic influence factor DB 28 based on the region or location, the road traffic information of which has been collected, accumulates, and manages the information. Under control of the traffic information provision module 25, the traffic influence factor collection module 27 collects road traffic influence information, which are expected to affect road traffic in a predetermined region or location at a point of time in the future, at which a traffic prediction is requested by a service subscriber. The collected information is transmitted to the traffic information provision module 25.

The traffic information provision module 25 extracts recent road traffic information and road image information, which are needed by the traffic information DB 23 and the image information DB 24, respectively, when a service subscriber makes a traffic information request via the wireless Internet interworking means 30. Based on the extracted information, the traffic information provision module 25 processes wireless Internet traffic information on the requested region or location and transmits the processed information to the service subscriber via the wireless Internet interworking means 30.

More particularly, the traffic information provision module 25 refers to the client information DB 26, when a service subscriber makes a traffic information request via the wireless Internet interworking means 30, and performs client authentication for that service subscriber. The traffic information provision module 25 identifies the service subscriber's communication environment and terminal type, as well as the version information of the wireless Internet browser loaded on the terminal. Based on analysis of the content of the traffic information request from the service subscriber, the traffic information provision module 25 extracts road traffic information and road image information regarding a specific region or location, which are necessary to process wireless Internet traffic information as requested, from the traffic information DB 23 and the image information DB 24, respectively. The traffic information provision module 25 processes wireless Internet traffic information, which is the result of the traffic information request and is suitable for the service subscriber, and transmits the information to the wireless Internet interworking means 30. In the case of the road image information, it is analyzed, before being processed into wireless Internet traffic information, and is converted into road image information, which has, for example, vehicle speed information and road name added thereto. The converted road image information is processed into wireless Internet road image information and transmitted to the wireless Internet interworking means 30.

When a service subscriber makes a traffic prediction request via the wireless Internet interworking means 30, the traffic information provision module 25 analyzes the content of the traffic prediction request and extracts road traffic information regarding a specific region or location, which is necessary to predict traffic at the requested traffic prediction time, and information on factors affecting traffic from the traffic information DB 23 and the traffic influence factor DB 28, respectively. The traffic information provision module 25 controls the traffic influence factor collection module 27 and collects road traffic influence information, which are expected to affect traffic at the requested traffic prediction time. Based on the above information, the traffic information provision module 25 forecasts future traffic flow in the requested region or location (at the requested traffic prediction time) and processes corresponding wireless Internet traffic prediction information, which is transmitted to the service subscriber via the wireless Internet interworking means 30.

In addition, the traffic information provision module 25 refers to the client information DB 26, when a service subscriber makes a traffic prediction request via the wireless Internet interworking means 30, and performs client authentication for that service subscriber. The traffic information provision module 25 identifies the service subscriber's terminal type and the version information of the wireless Internet browser loaded on the terminal. The traffic information provision module 25 processes wireless Internet traffic prediction information, which is the result of the traffic prediction request and is suitable for the service subscriber, and provides the service subscriber with a traffic prediction service. Based on the provided wireless Internet traffic prediction service, the traffic information provision module 25 manages service particulars.

The wireless Internet interworking means 30 may be implemented by a WAP (wireless application protocol) gateway, which connects service subscribers to the wireless Internet traffic information server 20. When a service subscriber requests traffic information regarding a specific region or location via a wireless Internet protocol, the wireless Internet interworking means 30 converts the request based on a TCP/IP protocol and transmits it to the traffic information provision module 25 of the wireless Internet traffic information server 20. Upon receiving wireless Internet traffic information from the traffic information provision module 25 as a result of the traffic information request, the wireless Internet interworking means 30 transmits the received information to the service subscriber via a base station system (not shown).

It is assumed in the present invention that a service subscriber uses a mobile communication terminal (e.g. portable telephone, portable PC, PDA terminal, smart phone, or laptop computer) which can be carried with him or mounted on his vehicle to perform a series of mobile communication via a base station system. To this end, the mobile communication terminal has a mobile browser loaded thereon and incorporates a series of wireless Internet functions.

Steps for collecting and storing information in a traffic information service system using wireless Internet, constructed as above, will now be described in detail with reference to FIG. 3.

In order to provide service subscribers with traffic information as requested, the wireless Internet traffic information server 20 interworks with the information provision means 10, collects road traffic information and road image information, stores the information in corresponding DBs, and manages the information. In addition, the wireless Internet traffic information server 20 collects road traffic influence information, stores the information in a DB, and manages the information.

Particularly, the traffic information collection module 21 of the wireless Internet traffic information server 20 interworks with various traffic information servers 11 of the information provision means 10 side according to a predetermined information collection schedule (S31*a*). As a result, road traffic information, which has been collected and managed by the traffic information servers 11, is collected by the wireless Internet traffic information server 20 side (S32*a*). The traffic information collection module 21 of the wireless Internet traffic information server 20 classifies the road traffic information, which is collected as a result of interwork with various traffic information servers 11 of the information provision means 10 side, based on region or location, as well as based on type of information (e.g. vehicle speed information, passage time information, traffic condition information, and detour information), and stores the classified information in the traffic information DB 23 in a text type (S33*a*). This procedure of road traffic information collection and storage according to the information collection schedule is repeated as necessary.

The image information collection module 22 interworks with various image information servers 12, which act as information provision means 10, according to a predetermined information collection schedule (S31*b*). As a result, road image information, which has been collected and managed by the image information servers 12, is collected by the wireless Internet traffic information server 20 side (S32*b*). The image information collection module 22 of the wireless Internet traffic information server 20 classifies the road image information, which is collected as a result of interwork with various image information servers 12 of the information provision means 10 side, based on region or location, as well as based on type of information, and stores the classified information on the image information DB 24 in an image type (S33*b*). This procedure of road image information collection and storage according to the information collection schedule is repeated as necessary.

The traffic influence factor collection module 27 interworks with various content servers, including a meteorological office server, a police server, a local information provision server, a sport information server, a central or local government server, and a shopping information server, from which information can be collected on factors which affect road traffic when the traffic information collection module 21 collects road traffic information (S31*c*). As a result of the interwork, the traffic influence factor collection module 27 collects information on factors, which affect road traffic in a pre-determined region or location when the traffic information collection module 21 collects road traffic information, at the same point of time as that of collection of road traffic information by the traffic information collection module 21, as well as at a pre-determined cycle, based on the characteristics (S32*c*). The factors include weather, date, day, time, holidays, consecutive holidays, events, gatherings, construction, and roadside facilities (e.g. schools, educational institutes, sport stadiums, amusement centers, tourist attractions, department stores, discount stores, markets, terminals, or stations).

The traffic influence factor collection module 27 of the wireless Internet traffic information server 20 stores road traffic influence information, which is collected as a result of interwork with various content servers, on the traffic influence factor DB 28 in accordance with road traffic information (S33*c*). This procedure of collection and storage of factors affecting traffic, under interwork with content servers, is repeated as necessary. In this manner, road traffic influence information is collected, accumulated, stored, and managed.

A series of steps for providing a traffic information service at a service subscriber's request, which has been made via wireless Internet, in a service system for providing traffic-related information via wireless Internet in the above-mentioned procedure, while road traffic information and road image information are collected and stored in respective DBs, will now be described in detail with reference to FIG. 4.

A user of a mobile communication terminal, which incorporates a wireless Internet function, runs a mobile browser and accesses the wireless Internet traffic information server 20 via a base station system and the wireless Internet interworking means 30. Then, the user requests a traffic information service regarding a specific region or location, the traffic information for which he wants to be provided with (S41). The traffic information provision module 25 of the wireless Internet traffic information server 20 refers to subscriber authentication information, which is stored in the client information DB 26, and performs client authentication for the user, who has requested the traffic information service (S42).

When it is confirmed that the user is a valid service subscriber, the traffic information provision module 25 refers to the client information DB 26 again and identifies the service subscriber's communication environment and terminal environment, particularly terminal type and terminal browser version information (S43).

The traffic information provision module 25 analyzes the content of the traffic information request made by the service subscriber and identifies the region or location, the traffic information of which the service subscriber wants to be provided with (S44).

In addition, the traffic information provision module 25 determines the type of requested traffic information. More particularly, the traffic information provision module 25 determines which of the following information the service subscriber has requested: road image information only, road image information including text-type road traffic information, and text-type road traffic information only (S45).

When it is determined that the service subscriber has solely requested road image information regarding a specific region or location, the traffic information provision module 25 accesses the image information DB 24 and extracts the requested road image information regarding the specific region or location from image information stored in the image information DB 24 (S46-1). The extracted road image information is analyzed and converted into road image information, which has information on, for example, vehicle speed and road name added thereto. The traffic information provision module 25 processes the converted road image information so as to be suitable for the service subscriber's communication environment and terminal environment, based on the service subscriber's communication environment, terminal type, and terminal browser version information, which have been identified previously, and composes a page containing the result of the traffic information request, which is based on wireless Internet image information (S47-1).

After composing the page containing the result of the traffic information request regarding the specific region or location based on wireless Internet image information, the page is transmitted to the wireless Internet interworking means 30, so that wireless Internet road image information, which is traffic information for a requested region or location, is transferred to the mobile communication terminal of the service subscriber via the wireless Internet interworking means 30 and the base station system (S48).

When it is determined in S45 that the service subscriber has requested both text-type road traffic information and road image information for a specific region or location, the traffic information provision module 25 accesses the traffic information DB 23 and extracts the requested text-type road traffic information regarding the specific region or location from traffic information stored in the traffic information DB 23. In addition, the traffic information provision module 25 accesses the image information DB 24 and extracts the requested road image information regarding the specific region or location from image information stored in the image information DB 24 (S46-2). After extracting road traffic information and wireless Internet image information in this manner, the traffic information provision module 25 analyzes the road image information and converts it into road image information, which has information on, for example, vehicle speed and road name added thereto. The traffic information provision module 25 processes the road traffic information and the road image information so as to be suitable for the service subscriber's communication environment and terminal environment, based on the service subscriber's communication environment, terminal type, and terminal browser version information, which have been identified previously, and composes a page containing the result of the traffic information request, which is based on wireless Internet image information and includes road traffic information as a series of texts (S47-2).

After composing the page containing the result of the traffic information request regarding the specific region or location, which is based on wireless Internet image information and includes text-type road traffic information, the page is transmitted to the wireless Internet interworking means 30, so that wireless Internet road image information, which is traffic information regarding the requested region or location and includes text-type road traffic information, is transferred to the mobile communication terminal of the service subscriber via the wireless Internet interworking means 30 and the base station system (S48).

When it is determined in S45 that the service subscriber has solely requested text-type road traffic information for a specific region or location, the traffic information provision module 25 accesses the traffic information DB 23 and extracts the requested text road traffic information for the specific region or location from traffic information stored in the traffic information DB 23 (S46-3). After extracting road traffic information, the traffic information provision module 25 processes the extracted road traffic information so as to be suitable for the service subscriber's communication environment and terminal environment, based on the service subscriber's communication environment, terminal type, and terminal browser version information, which have been identified previously, and composes a page containing the result of the traffic information request, which is based on wireless Internet road traffic information (S47-3).

After composing the page containing the result of the traffic information request regarding the specific region or location based on wireless Internet road traffic information, the page is transmitted to the wireless Internet interworking means 30, so that text-type road traffic information, which is traffic information for the requested region or location, is transferred to the mobile communication terminal of the service subscriber via the wireless Internet interworking means 30 and the base station system (S48).

After providing a service subscriber with a series of wireless Internet traffic information service via wireless Internet, the traffic information provision module 25 of the wireless Internet traffic information server 20 according to the present invention stores particulars of the provided service in the client information DB 26 and manages the information.

An illustrative example of the above-mentioned steps for providing a traffic information service based on wireless Internet will now be described.

When a user of a mobile communication terminal, which incorporates a wireless Internet function, runs a mobile browser and accesses the wireless Internet traffic information server 20, a service menu is displayed on the terminal screen, as shown in (a) of FIG. 5. The user selects desired menus through a series of key button operation to request a traffic information service regarding a specific region or location. For example, the user may successively select the following menus: "(1) Traffic conditions around Han River" and "(1) North Riverside Road," as shown in (b) of FIG. 5 (note: the Han River flows through Seoul, Korea, and bridges mentioned in this document are built over it). Then, the wireless Internet traffic information server 20 composes a page containing the result of the traffic information request based on wireless Internet traffic information, according to the above-mentioned procedure, and transmits the page to the mobile communication terminal via the wireless Internet interworking means 30 and the base station system. As a result, road traffic information is displayed on the terminal screen. Particularly, traffic information regarding entire North Riverside Road is provided, as shown in (c) of FIG. 5, or image information showing a specific location (e.g. image of North Riverside Road near Hannam Bridge) is provided, as shown in (d) of FIG. 5.

Instead of selecting menus, the user can input information regarding a specific region or location, the traffic information for which he wants to be provided with, through a series of key button input to request a desired traffic information service. The traffic information service provides not only traffic information regarding Metropolitan Area, expressways, and local roads, but also additional traffic information services including shortcut guidance and frequently-traveled road guidance.

A series of steps for providing a traffic prediction service at a service subscriber's request, which has been made via wireless Internet, in a service system for providing traffic-related information via wireless Internet in the procedure shown in FIG. 3, while road traffic information and road traffic influence information are collected, stored in respective DBs, and managed, will now be described in detail with reference to FIG. 6.

A user of a mobile communication terminal, which incorporates a wireless Internet function, runs a mobile browser and accesses the wireless Internet traffic information server 20 via a base station system and the wireless Internet interworking means 30. Then, the user requests a traffic prediction service regarding a specific region or location, the future traffic flow of which he wants to know (S61). The traffic information provision module 25 of the wireless Internet traffic information server 20 refers to subscriber authentication information, which is stored in the client information DB 26, and performs client authentication for the user, who has requested the traffic prediction service (S62).

When it is confirmed that the user is a valid service subscriber, the traffic information provision module 25 refers to the client information DB 26 again and identifies the service subscriber's terminal type and terminal browser version information (S63).

The traffic information provision module 25 analyzes the content of the traffic prediction service request made by the service subscriber and identifies the region or location, the traffic prediction of which the service subscriber wants to be provided with, as well as requested date and time of prediction (S64).

The traffic information provision module 25 accesses the traffic information DB 23 and the traffic influence factor DB 28 and extracts road traffic information for the identified region or location and road traffic influence information, respectively (S65). The traffic information provision module 25 controls the traffic influence factor collection module 27 and collects road traffic influence information, which are expected to affect traffic of the identified region or location at the identified date and time (S66).

After extracting and collecting road traffic information regarding the requested region or location and road traffic influence information, the traffic information provision module 25 forecasts road traffic in the future, particularly at the requested traffic prediction time, based on the above information. The service subscriber is provided with the resulting wireless Internet traffic prediction information.

More particularly, the traffic information provision module 25 predicts road traffic for a specific region or location for a specific time according to a traffic prediction request made by a service subscriber, based on road traffic information extracted from the traffic information DB 23, road traffic influence information extracted from the traffic influence factor DB 28, and road traffic influence information collected by controlling the traffic influence factor collection module 27 (S67). When predicting the road traffic, respective factors affecting traffic, including weather, date, day, time, holidays, consecutive holidays, events, gatherings, construction, and roadside facilities (e.g. schools, educational institutes, sport stadiums, amusement centers, tourist attractions, department stores, discount stores, markets, terminals, or stations), may have weight values assigned thereto based on their influence on the traffic.

After predicting road traffic as requested, the traffic information provision module 25 processes wireless Internet traffic prediction information so as to be suitable for the service subscriber, based on the predicted road traffic information, according to the service subscriber's terminal type and terminal browser version information, which have been identified previously, and composes a page containing a series of results of the traffic prediction request (S68).

After composing a page containing the result of the traffic prediction request regarding a specific region or location, the traffic prediction of which has been requested by the service subscriber, the page is transmitted to the wireless Internet interworking means 30. This provides a series of traffic prediction service of transmitting traffic prediction information regarding a requested region or location to the mobile communication terminal of the service subscriber via the wireless Internet interworking means 30 and the base station system (S69).

After providing the service subscriber with a series of wireless Internet traffic prediction service via wireless Internet, the traffic information provision module 25 of the wireless Internet traffic information server 20 according to the present invention stores particulars of the provided service in the client information DB 26 and manages the information.

An illustrative example of the above-mentioned steps for providing a traffic prediction service based on wireless Internet will now be described with reference to FIG. 7.

When a user of a mobile communication terminal, which incorporates a wireless Internet function, runs a mobile browser and accesses the wireless Internet traffic information server 20, a service menu is displayed on the terminal screen, as shown in (a) of FIG. 7. The user selects desired menus through a series of key button operation to request a traffic prediction service regarding a specific region or location at a point of time in the future. For example, the user may successively select the following menus: "(1) Roads around Han River," "(1) North Riverside Road," and "(2) 3 hours later," as shown in (b) of FIG. 7. Then, the wireless Internet traffic information server 20 composes a page containing the result of the traffic prediction request based on wireless Internet traffic prediction information, according to the above-mentioned procedure, and transmits the page to the mobile communication terminal via the wireless Internet interworking means 30 and the base station system. As a result, a traffic prediction is displayed on the terminal screen. Particularly, information regarding predicted traffic of the entire North Riverside Road or a specific location (e.g. near Hannam Bridge), 3 hours later (3:00 p.m.), is displayed on the terminal as shown in (c) or (d) of FIG. 7.

Instead of selecting menus, the user can input information on a specific region or location, the traffic of which is to be predicted, through a series of key button input to request a desired traffic prediction service. The traffic prediction service provides not only traffic prediction regarding Metropolitan Area, expressways, and local roads, but also simple traffic prediction services including a shortcut prediction and a frequently-traveled road prediction.

A second embodiment of the information transmission means, when it is broadcasting (e.g. satellite broadcasting, DMB, or cable data broadcasting), will now be described. The second embodiment relates to a system and a method for a service of providing service subscribers (i.e. broadcast subscribers), who use wired/wireless terminals incorporating broadcasting function, with traffic-related information. For easier understanding, the information processing means 20 shown in FIG. 1 will hereinafter be referred to as a broadcasting traffic information server 20, and the information transmission means 30 shown in FIG. 1 as a broadcasting station 50.

An information provision service system according to the second embodiment interworks with a series of information provision means 10; collect road traffic information, road image information, etc.; stores the information in corresponding DBs; manages the information; processes the information so as to be suitable for broadcasting at a later time; performs a series of information verification; transmits the information to broadcast subscribers via a broadcast transmitter to provide all collected traffic information in real time. When a broadcast subscriber makes a traffic-related information request via a return channel, the information provision service system accesses road traffic information and road image information stored in corresponding DBs and selectively provides the broadcast subscriber with a series of traffic-related information regarding the desired region or location via the return channel.

In addition, the information provision service system according to the second embodiment collects road traffic influence information, stores the information in a DB, and manages the information. Based on the information, the system predicts traffic for a predetermined prediction period, composes broadcasting traffic prediction information accordingly, and transmits the information to broadcast subscribers via a broadcast transmitter to provide a traffic prediction service corresponding to a pre-determined prediction period. When a broadcast subscriber makes a specific traffic prediction request via a return channel, the system predicts road traffic for the requested prediction period, based on road traffic information regarding the requested region or location, which is stored in the DB, and road traffic influence information, and selectively provides the broadcast subscriber with a series of traffic prediction information via the return channel. To this end, the traffic-related information service system has a construction as shown in FIG. 8.

The traffic-related information provision service system using broadcasting according to the second embodiment of the present invention, referring to FIG. 8, includes an information provision means 10, a broadcasting traffic information server 40, and a broadcasting station 50. The information provision means 10 provides a series of road traffic information and road image information. The broadcasting traffic information server 40 interworks with the information provision means 10; collects road traffic information and road image information; stores the information in respective DBs; manages the information; processes the road traffic information and road image information so as to be suitable for broadcasting at a later time; performs information verification; transmits the broadcasting traffic information to the broadcasting station 50, so that broadcast subscribers are provided with a broadcasting-based traffic-related information service via the broadcasting station 50 and a broadcasting network. When a broadcast subscriber makes a traffic information request via a return channel and the broadcasting station 50, the broadcasting traffic information server 40 accesses the road traffic information and road image information stored in the DBs and transmits broadcasting traffic information regarding the requested region or location to the service subscriber via the broadcasting station 50 and the return channel. The broadcasting station 50 transmits a series of broadcasting-based traffic-related information between the broadcasting traffic information server 40 and broadcast subscribers, as well as requests and responds to traffic information requests via the return channel.

The broadcasting traffic information server 40 collects road traffic influence information at a point of time of collection of road traffic information, as well as at a pre-determined cycle, accumulates the information, and manages the information. Based on various road traffic information and road traffic influence information, the broadcasting traffic information server 40 predicts road traffic in a specific region or location for a predetermined prediction time, composes information suitable for broadcasting, performs information verification, and transmits the broadcasting traffic prediction information to the broadcasting station 50. When a broadcast subscriber makes a traffic prediction request via the return channel and the broadcasting station 50, the broadcasting traffic information server 40 accesses road traffic information and road traffic influence information, which have been accumulated on the DBs, predicts road traffic in the requested region or location at the requested time, composes broadcasting traffic prediction information, and transmits the information to the broadcast subscriber via the broadcasting station 50 and the return channel.

The broadcasting network for connecting the broadcasting station 50 to broadcast subscribers may be a satellite, in the case of satellite broadcasting; a ground wave or satellite DMB network, in the case of DMB; or a wired cable network, in the case of cable data broadcasting. The return channel, which is connected to the broadcasting station 50, may be a wired/wireless communication network, in the case of satellite broadcasting; a wireless communication network, in the case of DMB; or a wired cable network, in the case of cable data broadcasting. In the case of satellite broadcasting and cable data broadcasting, broadcast receivers include a set-top box (STB) and a screen display device (TV) and, in the case of DMB, they include a PDA and a portable receiver. Each broadcast receiver must have its own identification information so that each broadcast subscriber can be identified.

The broadcasting traffic information server 40 will now be described in more detail with reference to FIG. 9.

A traffic information collection module 41 interworks with various traffic information servers 11, which act as information provision means 10; collects a series of road traffic information collected and managed by the traffic information servers 11; classifies the information based on region or location; tabulate the traffic information based on type; and stores the information in a traffic information DB 43.

An image information collection module 42 interworks with various image information servers 12, which act as information provision means 10; collects a series of road image information (e.g. JPEG images) collected and managed by the image information servers 12; classifies the information based on region or location; tabulate the image information based on type; and stores the information in an image information DB 44.

The traffic influence factor collection module 49*a* collects information of a region or location, the road traffic information of which is collected by the traffic information collection module 41. More particularly, the traffic influence factor collection module 49*a* collects information on external factors, including weather, date, day, time, holidays, consecutive holidays, events, gatherings, construction, and roadside facilities (e.g. schools, educational institutes, sport stadiums, amusement centers, tourist attractions, department stores, discount stores, markets, terminals, or stations). Then, the traffic influence factor collection module 49*a* stores the collected information in a traffic influence factor DB 49*b* based on the region or location, the road traffic information of which has been collected, accumulates, and manages the information. In addition, the traffic influence factor collection module 49*a* collects information on factors affecting current traffic, which affect road traffic at the point of time of collection of road traffic information, and information on factors affecting future traffic, which are expected to affect road traffic for a predetermined traffic prediction period (i.e. future period in which road traffic is to be predicted), at a point of time of collection of road traffic information collection, as well as at a predetermined cycle, based on the characteristics.

A traffic information transmission module 45 periodically extracts road traffic information and road image information, which are stored in the traffic information DB 43 and the image information DB 44, respectively, and transmits them to a broadcasting traffic information provision module 46. The traffic information transmission module 45 accesses the traffic information DB 43 and the traffic influence factor DB 49*b* to extract various road traffic information and road traffic influence information, which are necessary to compose broadcasting traffic prediction information for a predetermined traffic prediction period and transmits them to the broadcasting traffic information provision module 46.

The broadcasting traffic information provision module 46 processes the road traffic information and road image information, which are transmitted from the traffic information transmission module 45, into broadcasting traffic information suitable for broadcasting (the processing includes designating road names and geographical names, adding vehicle speed information, and converting data). The broadcasting traffic information provision module 46 performs a series of information verification (data verification, update cycle verification, vehicle speed and time verification) and transmits the information to a broadcast transmitter 51 of the broadcasting station 50, so that broadcast subscribers are provided with a series of broadcasting-based real-time traffic information via the broadcast transmitter 51 and the broadcasting network. Based on various road traffic information and road traffic influence information, which are transmitted from the traffic information transmission module 45, the broadcasting traffic information provision module 46 predicts road traffic for a predetermined prediction period, composes broadcasting traffic prediction information suitable for broadcasting, performs a series of information verification (data verification, update cycle verification, vehicle speed and time verification), and transmits the information to the broadcast transmitter 51 of the broadcasting station 50, so that broadcast subscribers are provided with a traffic prediction service corresponding to a pre-determined prediction period via the broadcast transmitter 51 and the broadcasting network.

A broadcasting application module 47 transmits an application for displaying traffic information on a screen, when a broadcasting-based traffic-related information service is provided via the broadcasting station 50 and the broadcasting network, to the broadcast transmitter 51 of the broadcasting station 50.

A return response module 48 receives a traffic information request, which contains the content of a traffic information request made by a broadcast subscriber via a return channel, from a broadcast return response server 52 of the broadcasting station 50; analyzes the content of the traffic information request; extracts road traffic information and road image information regarding the requested region or location from the traffic information DB 43 and the image information DB 44; processes the road traffic information and road image information into broadcasting traffic information suitable for broadcasting; performs a series of information verification; and transmits broadcasting traffic information regarding the requested region or location to the broadcast return response server 52 of the broadcasting station 50. This completes the response to the traffic information request.

In addition, the return response module 48 receives a traffic prediction request, which contains the content of a traffic prediction request made by a broadcast subscriber via the return channel, from a broadcast return response server 52 of the broadcasting station 50; analyzes the content of the traffic prediction request; extracts road traffic information regarding a specific region or location and road traffic influence information, which are necessary for the requested traffic information prediction service, from the traffic information DB 43 and the traffic influence factor DB 49*b*; predicts road traffic for a requested prediction period, based on the extracted road traffic information and road traffic influence information; composes broadcasting traffic prediction information suitable for broadcasting; performs information verification; and transmits the information to the broadcast return response server 52 of the broadcasting station 50. This completes the response to the traffic prediction request.

The broadcasting station 50 includes a broadcast transmitter 51 and a broadcast return response server 52. In order to provide broadcast subscribers with a traffic-related information service, the broadcast transmitter 51 transmits an application, which is used to display traffic information from the broadcasting traffic information server 40 on a screen, to broadcast receivers of the broadcast subscriber side via the broadcasting network. In addition, the broadcast transmitter 51 transmits broadcasting traffic-related information, which is periodically transmitted from the broadcasting traffic information server 40, to broadcast subscribers via the broadcasting network. When a broadcast subscriber makes a traffic-related information request via the return channel, the broadcast return response server 52 analyzes the content of the traffic-related information request and requests traffic information regarding a specific region or location from the return response module 48 of the broadcasting traffic information server 40. When broadcasting traffic-related information regarding the requested region or location is transmitted as a response to the traffic-related information request, the broadcast return response server 52 forward the information to the broadcast subscriber, who has made the request, via the return channel.

In order to be provided with a broadcasting-based traffic-related information service according to the present invention, a broadcast subscriber is supposed to use a broadcasting service via a broadcast receiver (e.g. portable receiver or vehicular receiver), which is connected to the broadcasting network, and a screen output device (e.g. TV). The broadcast receiver must have its own identification information so that each broadcast subscriber can be identified. In addition, the broadcast receiver must be able to provide a series of return channels, which are connected to the broadcast return response server 52 of the broadcasting station 50 via a wired/wireless communication network (e.g. telephone network, Internet, ISDN, CDMA, WCDMA, or wireless Internet) or a wired cable network, so that the broadcast subscriber can request traffic information regarding a desired region or location.

Steps for collecting and storing information in the traffic-related information service system using broadcasting, constructed as above, are identical to those of the traffic information collection module 21, image information collection module 22, and traffic influence factor collection module 27 of the wireless Internet traffic information server 20, which have been described with reference to FIG. 3, and repeated description thereof will be omitted herein. Particularly, the traffic information collection module 41, image information collection module 42, and traffic influence factor collection module 49*a* of the broadcasting traffic information server 40 shown in FIG. 9 are operated substantially in the same manner as the traffic information collection module 21, image information collection module 22, and traffic influence factor collection module 27 of the wireless Internet traffic information server 20 shown in FIG. 2, respectively.

A series of steps for providing a broadcast subscriber, who uses a broadcasting service, with a traffic information service in a traffic-related information service system using broadcasting according to the above-mentioned procedure, while road traffic information and road image information are collected and stored in respective DBs, will now be described in detail with reference to FIG. 10.

The traffic information collection module 41 and the image information collection module 42 store various road traffic information and road image information in the traffic information DB 43 and the image information DB 44, respectively. Under control of the broadcasting traffic information provision module 46, the traffic information transmission module 45 periodically extracts road traffic information and road image information, which are stored in the traffic information DB 43 and the image information DB 44, respectively, and transmits them to the broadcasting traffic information provision module 46 (S71).

The broadcasting traffic information provision module 46 processes the road traffic information and road image information, which have been transmitted from the traffic information transmission module 45, into broadcasting traffic information suitable for broadcasting by designating road names and geographical names, adding vehicle speed information, and performing a series of data conversion. The processed broadcasting traffic information is subjected to a series of information verification, including data verification, update cycle verification, vehicle speed and time verification, and is transmitted to the broadcast transmitter 51 of the broadcasting station 50 (S72).

In order to provide broadcast subscribers with a traffic information service, the broadcast transmitter 51 transmits an application for displaying traffic information on a screen, which has been transmitted from the broadcasting application module 47 of the broadcasting traffic information server 40, to broadcast receivers of the broadcast subscriber side via the broadcasting network. In addition, the broadcast transmitter 51 transmits broadcasting traffic information, which is periodically transmitted from the broadcasting traffic information provision module 46 of the broadcasting traffic information server 40, via the broadcasting network so that broadcast subscribers are provided with a series of broadcasting-based real-time traffic information service (S73).

While broadcast subscribers are provided with the traffic information service in this manner, the broadcast return response server 52 of the broadcasting station 50 checks whether or not a broadcast subscriber makes a traffic information request regarding a specific region or location via the return channel (S74). The series of broadcasting-based real-time traffic information service is continuously provided, as long as there is no traffic information request from broadcast subscribers.

However, when it is confirmed that a broadcast subscriber has made a traffic information request, particularly, when a broadcast subscriber has accessed a wired/wireless communication network, which provides a return channel, by operating a remote control, for example, and has made a traffic information request regarding a specific region or location, the traffic information of which he wants to be provided, to the broadcasting station 50, the broadcast receiver creates a traffic information request content, which has identification information of the broadcast subscriber added thereto, and transmits it to the broadcast return request server 52 of the broadcasting station 50 via the return channel of the wired/wireless communication network, which is connected to the receiver.

Upon receiving the traffic information request content of a broadcast subscriber, the broadcast return response server 52 of the broadcasting station 50 analyzes the traffic information request content, which has been transmitted via the return channel of the broadcast subscriber, and identifies the region or location, the traffic information of which he wants to be provided with. Then, the broadcast return response server 52 makes a traffic information request regarding the identified region or location to the return response server 48 of the broadcasting traffic information server 40 (S75).

In accordance with the traffic information request from the broadcast return response server 52 of the broadcasting station 50, the return response module 48 of the broadcasting traffic information server 40 accesses the traffic information DB 43 and the image information DB 44 to extract road traffic information and road image information regarding the requested region or location. The extracted road traffic information and road image information regarding the requested region or location are processed into broadcasting traffic information suitable for broadcasting (S76).

The processed broadcasting traffic information regarding the requested region or location is subjected to a series of information verification and transmitted to the broadcast return response server 52 of the broadcasting station 50 as a response to the traffic information request (S77).

Upon receiving the broadcasting traffic information regarding the requested region or location as a response to the traffic information request, the broadcast return response server 52 of the broadcasting station 50 transmits the information to the corresponding broadcast subscriber via the return channel. The identification information of the broadcast subscriber (e.g. broadcast receiver identification information), which has been included in the traffic information request content at the time of request, is used to identify the broadcast subscriber who has made the request. The broadcast receiver of the broadcast subscriber displays the broadcasting traffic information regarding the requested region or location, which is transmitted via the return channel, on the screen output device so that the broadcast subscriber is provided with broadcasting-based traffic information regarding the requested region or location (S78).

After providing a service subscriber with a series of broadcasting-based traffic information service as requested, the broadcasting traffic information server 40 according to the second embodiment of the present invention stores particulars of the provided service in a separate client information DB (not shown) and manages the information.

A series of steps for providing a broadcast subscriber, who uses a broadcasting service, with a traffic prediction service in a traffic-related information service system using broadcasting according to the above-mentioned procedure, while road traffic information and road traffic influence information are collected and stored in respective DBs, will now be described in detail with reference to FIG. 11.

The traffic information collection module 41 and the traffic influence factor collection module 49*a* accumulate and store various road traffic information and road traffic influence information in the traffic information DB 43 and the traffic influence factor DB 49*b*, respectively. The traffic information transmission module 45 periodically extracts various road traffic information and road traffic influence information, which are accumulated and stored in the traffic information DB 43 and the traffic influence factor DB 49*b*, respectively, and transmits them to the broadcasting traffic information provision module 46 (S81).

The broadcasting traffic information provision module 46 predicts road traffic corresponding to a predetermined prediction period based on various road traffic information and road traffic influence information, which have been transmitted from the traffic information transmission module 45, and composes broadcasting traffic prediction information accordingly (S82).

The broadcasting traffic information provision module 46 performs information verification, including data verification, update cycle verification, vehicle speed and time verification, to the composed broadcasting traffic prediction information (S83) and transmits it to the broadcast transmitter 51 of the broadcasting station 50 (S84).

In order to provide broadcast subscribers with a traffic prediction service, the broadcast transmitter 51 transmits an application for displaying a traffic prediction information on a screen, which has been transmitted from the broadcasting application module 47 of the broadcasting traffic information server 40, to broadcast receivers of the broadcast subscriber side via the broadcasting network. In addition, the broadcast transmitter 51 transmits broadcasting traffic prediction information, which is periodically transmitted from the broadcasting traffic information provision module 46 of the broadcasting traffic information server 40, via the broadcasting network so that broadcast subscribers are provided with a broadcasting-based traffic prediction service based on prediction period, for example, short-term prediction, everyday prediction, weekly prediction, monthly prediction, or seasonal prediction (S85).

Steps for providing a traffic prediction service when a broadcast subscriber makes a specific traffic prediction request, while broadcast subscribers are provided with the traffic information service corresponding to a predetermined prediction period, will now be described in detail with reference to FIG. 12.

The broadcasting traffic information server 40 provides a traffic prediction service corresponding to a predetermined prediction period, according to the above-mentioned procedure. The broadcast return response server 52 of the broadcasting station 50 checks whether or not a broadcast subscriber makes a traffic prediction request regarding a specific region or location via the return channel, while the traffic prediction service is being provided (S91).

The broadcasting-based traffic prediction service corresponding to a predetermined prediction period is continuously provided by the broadcasting traffic information server 40, as long as there is no traffic prediction request from broadcast subscribers (S92).

However, when it is confirmed that a broadcast subscriber has made a traffic prediction request, particularly, when a broadcast subscriber has accessed a wired/wireless communication network, which provides a return channel, by operating a remote control, for example, and has made a traffic prediction service request for a pre-determined period regarding a specific region or location, the traffic of which he wants to know beforehand, to the broadcasting station 50, the broadcast receiver creates a traffic prediction request content (including desired region or location and period), which has identification information of the broadcast subscriber added thereto, and transmits it to the broadcast return request server 52 of the broadcasting station 50 via the return channel of the wired/wireless communication network, which is connected to the receiver.

Upon receiving the traffic prediction request content of a broadcast subscriber, the broadcast return response server 52 of the broadcasting station 50 analyzes the traffic prediction request content, which has been transmitted via the return channel of the broadcast subscriber, and identifies the region or location, the traffic prediction of which he wants to be provided with, and the desired prediction period. Then, the broadcast return response server 52 makes a traffic prediction request regarding the identified region or location and prediction period to the return response server 48 of the broadcasting traffic information server 40 (S93).

In accordance with the traffic prediction request from the broadcast return response server 52 of the broadcasting station 50, the return response module 48 of the broadcasting traffic information server 40 accesses the traffic information DB 43 and the traffic influence factor DB 49*b* to extract road traffic information regarding the requested region or location and road traffic influence information, which are necessary to compose traffic prediction information as requested. Extracted information includes various road traffic information regarding the requested region or location and road traffic influence information of the requested region or location for the requested prediction period (S94).

After extracting various road traffic information and road traffic influence information, which correspond to the requested region or location and prediction period, the return response module 48 predicts road traffic for the requested prediction period, based on the above information, and composes broadcasting traffic prediction information suitable for broadcasting (S95). The composed broadcasting traffic prediction information is subjected to a series of information verification (S96) and is transmitted to the broadcast return response server 52 of the broadcasting station 50 as a response to the traffic prediction request (S97).

Upon receiving the broadcasting traffic prediction information regarding the requested region or location for the requested prediction period as a response to the traffic prediction request, the broadcast return response server 52 of the broadcasting station 50 transmits the information to the corresponding broadcast subscriber via the return channel. The identification information of the broadcast subscriber (i.e. broadcast receiver identification information), which has been included in the traffic prediction request content at the time of request, is used to identify the broadcast subscriber who has made the request. The broadcast receiver of the broadcast subscriber displays the broadcasting traffic prediction information regarding the requested region or location for the requested period, which is transmitted via the return channel, on the screen output device so that the broadcast subscriber is provided with broadcasting-based traffic prediction service corresponding to the requested region or location and prediction period (S98).

After providing a service subscriber with a series of broadcasting-based traffic prediction service as requested, the broadcasting traffic information server 40 according to the present invention stores particulars of the provided service on a separate client information DB (not shown) and manages the information.

An illustrative example of the steps for providing a broadcasting-based traffic information service, which have been described with reference to FIG. 10, will now be described with reference to accompanying drawings.

When a broadcast subscriber selects a channel, which provides a traffic information service, by operating a remote control, for example, the broadcast receiver uses an application for traffic information screen display, which has been received from the broadcast transmitter 51 of the broadcasting station 50 via the broadcasting network, to display a service screen on the screen output device, as shown in FIG. 13. The broadcast subscriber then selects desired service menus by operating the remote control, for example, to request a traffic information service regarding a specific region or location. For example, the broad subscriber may successively select the following menus: Traffic conditions around Han River and North Riverside Road as shown in FIG. 14. The broadcasting traffic information server 40 transmits broadcasting traffic information via the broadcast transmitter 51 of the broadcasting station 50 and the broadcasting network according to the above-mentioned procedure. In this manner, the broadcast subscriber is provided with road traffic information regarding entire North Riverside Road as requested.

When the broadcast subscriber requests traffic information regarding a specific location, for example, information on North Riverside Road near Hannam Bridge, via the return channel connected to the broadcast receiver, the broadcast return response server 52 of the broadcasting station 50 and the return response module 48 of the broadcasting traffic information server 40 transmit information regarding the requested location (i.e. near Hannam Bridge) to the broadcast subscriber via the return channel. In this manner, the broadcast subscriber is provided detailed traffic information regarding North Riverside Road near Hannam Bridge, as shown in FIG. 15.

The traffic information service provides not only traffic information regarding Metropolitan Area, expressways, and local roads, but also additional traffic information services including shortcut guidance, information on currently-traveled road, and viewing maps.

An illustrative example of the series of steps for providing a satellite-based traffic prediction service, which have been described with reference to FIGS. 11 and 12, will now be described with reference to accompanying drawings.

When a broadcast subscriber selects a channel, which provides a traffic prediction service, by operating a remote control, for example, the broadcast receiver uses an application for traffic information screen display, which has been received from the broadcast transmitter 51 of the broadcasting station 50 via the broadcasting network, to display a service screen on the screen output device, as shown in FIG. 16. The broadcast subscriber then selects desired service menus by operating the remote control, for example, to request a traffic prediction service regarding a specific region or location at a desired point of time in the future. For example, the broad subscriber may successively select the following menus: "Seoul-Busan Expressway" from "Expressway traffic prediction" and "3 hours later prediction" from "Seoul-Busan Expressway prediction" as shown in FIG. 17. The broadcasting traffic information server 40 composes broadcasting traffic prediction information in the above-mentioned procedure and transmits it via the broadcast transmitter 51 of the broadcasting station 50 and the broadcasting network. In this manner, the broadcast subscriber is provided with traffic prediction information regarding entire Seoul-Busan Expressway 3 hours later.

When the broadcast subscriber requests a traffic prediction regarding a specific location at a specific point of time, for example, prediction regarding Seoul-Busan Expressway near Metropolitan Area 3 hours later, via the return channel connected to the broadcast receiver, the broadcast return response server 52 of the broadcasting station 50 and the return response module 48 of the broadcasting traffic information server 40 transmit traffic prediction information regarding the requested location at the request time (i.e. Seoul-Busan Expressway near Metropolitan Area 3 hours later) to the broadcast subscriber via the return channel. In this manner, the broadcast subscriber is provided detailed traffic prediction information regarding Seoul-Busan Expressway near Metropolitan Area 3 hours later, as shown in FIG. 18.

The traffic prediction service provides not only traffic prediction regarding Metropolitan Area, expressways, and local roads, but also additional traffic prediction services including shortcut prediction, information on currently-traveled road, and viewing maps.

A third embodiment of a system and a method for providing service subscribers (broadcast subscribers), who use wired/wireless terminals incorporating broadcasting function, with a position information service, when the information transmission means is broadcasting (e.g. satellite broadcasting, DMB, or cable data broadcasting), will now be described. For easier understanding, the position information server 13 of the information provision means 10 shown in FIG. 1 will retain the same name and reference numeral, while the information processing means 20 and information transmission means 30 shown in FIG. 1 will hereinafter be referred to as a broadcasting position information server 120 and a broadcasting station 130, respectively.

A position information provision service system according to the third embodiment of the present invention, constructed as shown in FIG. 19, is operated as follows: when a broadcast subscriber requests position information regarding a specific object, the position of which is to be tracked, via a return channel realized as a communication line, a position information server, which manages the position information of a position information generation device carried by the object, provides the system with corresponding position information. Then, the system processes the information so as to be suitable for broadcasting and provides the broadcast subscriber with it as requested.

The position information provision service system using broadcasting according to the third embodiment of the present invention, referring to FIG. 19, includes a position information server 13 for providing position information of a position information generation device 14 carried an object, the position of which is to be tracked; a broadcasting station 130 for forwarding a position tracking request made by a broadcast subscriber via a return channel and transmitting a series of broadcasting-based position information; and a broadcasting position information server 120 for requesting position information of the position information generation device 14 to the position information server 13 in response to the position tracking request from the broadcasting station 130, performing data conversion and verification, and transmitting requested position information to a broadcast reception medium of the broadcast subscriber.

The position information server 13 receives signals from position information generation devices 14 carried by objects, the position of which is to be tracked, and stores information on the current position of respective position information generation devices 14. The position information generation devices 14 may be any of various media, including portable telephones, PDAs, laptop computers, GPS transmission devices, and RF transmission devices. The position information server 13, which manages information on the position of the position information generation devices 14, may be a home-position register for a mobile communication system, a GPS system, or an RF wireless processing device, depending on the type of the position information generation devices 14.

The broadcasting station 130 for providing broadcast subscribers with a broadcasting service interworks with the broadcasting position information server 120, which are linked with various position information servers 13, so that a position tracking request regarding a specific position information generation device is transmitted to the broadcasting position information server 120 via the broadcasting station 130, and requested position information is searched and processed by the broadcasting position information server 120 and transmitted to the broadcast subscriber. The broadcasting position information server 120 and the broadcasting station 130 will now be described in more detail with reference to FIG. 19.

As shown in FIG. 19, the broadcasting position information serer 120 includes a broadcasting application module 122 connected to a broadcast transmitter 132 of the broadcasting station 130; a map information DB 128; a position information server DB 126; and a broadcasting position information provision module 124 for requesting position information to the position information server 13 under interwork with the broadcasting station 130, receiving the position information, processing and verifying the received position information, and transmitting the information to the broadcasting station 130.

The broadcasting application module 122 provides the broadcasting station 130 with an application for providing position information, so that a broadcast subscriber can view the current position of an object, the position of which is to be tracked, on the map via a broadcast receiver.

The broadcasting position information provision module 124 extracts the identifier (e.g. telephone number, device number, or proper number) of a position information generation device 14, the position of which is to be tracked, searches a position information server 13, which manages the position information of the position information generation device 14, from the position information server DB 126, and transmits the identifier of the position information generation device 14 to the position information server 13 to request position information provision.

Upon collecting position information of the position information transmission device 14, the position of which is to be tracked, the broadcasting position information provision module 124 reads map information, which corresponds to the collected position information, from the map information DB 128. The broadcasting position information provision module 124 combines the position information with the map information and processes it into broadcasting position information suitable for broadcasting (e.g. designates road names and geographical names on the map, which has position information indicated thereon, and converts data). The broadcasting position information provision module 124 determines whether or not the processed data is suitable for broadcasting, verifies position change, decides whether or not there is data error, and transmits the information to the broadcasting station 130.

The broadcasting station 130 has a broadcast transmitter 132 for transmitting broadcasting signals and a return response server 134 connected to broadcast receivers of subscribers via communication lines to receive position tracking requests made by the subscribers and process the requests.

When a broadcast subscriber makes a position tracking request via a return channel realized as a communication line, the return response server 134 transmits information on a position information generation device 14, the position information of which has been requested, to the position information server 120 and extracts identification information (e.g. broadcast receiver identification information) of the broadcast subscriber, who has made the position tracking request. Upon receiving position information from the broadcasting position information server 120, the return response server 134 transmits the position information to the broadcast subscriber, who has made the position tracking request, in accordance with the identification information (e.g. broadcast receiver identification information) of the broadcast subscriber.

While transmitting broadcasting signals via the broadcast transmitter 132 in a normal mode, the broadcasting station 130 separately receives a position tracking request from a broadcast subscriber via the return response server 134 and forwards it to the broadcasting position information server 120. Upon receiving position information in response to the position tracking request, the broadcasting station 130 transmits it to the broadcast subscriber, who has made the request. In this manner, a broadcast subscriber can request position tracking of a specific object, while watching a broadcast via a broadcast receiver, and view the result as being displayed on the receiver s screen.

The broadcasting network for connecting the broadcasting station 50 to broadcast subscribers may be a satellite, in the case of satellite broadcasting; a ground wave or satellite DMB network, in the case of DMB; or a wired cable network, in the case of cable data broadcasting. The return channel, which is connected to the broadcasting station 50, may be a wired/wireless communication network, in the case of satellite broadcasting; a wireless communication network, in the case of DMB; or a wired cable network, in the case of cable data broadcasting. In the case of satellite broadcasting and cable data broadcasting, the broadcast receiver includes a set-top box (STB) and a screen display device (TV) and, in the case of DMB, includes a PDA and a portable receiver. Each broadcast receiver must have its own identification information so that each broadcast subscriber can be identified.

Steps for providing position information in the position information provision service system using broadcasting, constructed as above, will now be described with reference to FIG. 20.

The broadcasting position information server 120 receives a position tracking request from a broadcast subscriber via the return response server 134 of the broadcasting station 130 (S130). The broadcasting subscriber can access a communication line, which provides a return channel, by operating a remote control, for example, to makes a position information request regarding a position information generation device 14 to the broadcasting position information server 120. The broadcast receiver of the broadcast subscriber creates a position tracking request content, which has identification information of the broadcast subscriber added thereto, and transmits it to the return response server 134 of the broadcasting station 130 via the return channel of the communication connected to the receiver. The return response server 134 analyzes the position tracking request content of the broadcast subscriber and forwards information on the position information generation device 14, the position of which is to be tracked, to the broadcasting position information server 120.

The broadcasting position information server 120 analyzes the position tracking request from the return response server 134 of the broadcasting station 130, extracts the identifier (e.g. telephone number, device number, or proper number) of the position information generation device 14, the position of which is to be tracked, and searches a position information server 13, which manages position information of the position information generation device 14, from the position information server DB 126. The position information generation device 14 may be any type of medium, as long as its position can be tracked. Accordingly, the position information server 13 can be any of a home-position register for a mobile communication system, an LBS system, a GPS system, an RF wireless control system, and a TRS system.

The broadcasting position information server 120 forwards the identifier of the position information generation device 14, the position of which is to be tracked, to the searched position information server 13 and requests it to provide position information (S134).

Upon collecting position information of the position information transmission device 14, the position of which is to be tracked (S136), the broadcasting position information server 120 reads map information, which corresponds to the collected position information, from the map information DB 128. The broadcasting position information server 120 combines the position information with the map information and processes it into broadcasting position information suitable for broadcasting (e.g. designates geographical names and road names on the map, which has position information indicated thereon, and converts data). The broadcasting position information server 120 determines whether or not the processed data is suitable for broadcasting, verifies position change, decides whether or not there is data error, and transmits the information to the broadcasting station 130 (S138).

Based on the identification information (e.g. broadcast receiver identification information) of the broadcast subscriber, who has requested the position information, the broadcasting 130 sends the position information to the broadcast subscriber via his return channel (S140). Particularly, the position information is transmitted to the broadcast receiver of the broadcast subscriber, who has requested the position information, via the communication line and displayed on the screen of the broadcast receiver. In this manner, the broadcast subscriber is easily provided with position information of an object, the position of which is to be tracked, using menus provided via the broadcast.

The menu screen provided on the screen of the broadcast receiver, when the broadcast subscriber requests position tracking via the return channel, may be constructed as shown in FIGS. 21 to 24. Together with the service screen 100 shown in FIG. 21, the broadcast subscriber is also provided with a navigation menu 102 for selecting information input, screen conversion, etc. The broadcast subscriber can input a desired menu selection signal with an input device (e.g. remote control) to use the position information service.

When menu Detailed information is selected from the Position information service screen, a detailed menu 200, including Position confirmation input menu and Registration information menu, is provided as shown in FIG. 22. When the Position confirmation input menu is selected, a telephone number input window 300 for inputting the telephone number of an object, the position of which is to be tracked, is displayed as shown in FIG. 23. Although the window 300 has a format based on an assumption that the position information generation device 14, the position of which is to be tracked, is a portable telephone, the format may vary depending on the type of the position information generation device 14.

When the telephone number of a position information generation device 14, the position of which is to be tracked, is inputted on the telephone number input window 300 shown in FIG. 23 using a remote control, for example, and transmitted, the information is transmitted to the broadcasting station 130 via a communication line. Then, the broadcasting station 130 interworks with the broadcasting position information server 120 to track the current position of a mobile communication terminal, which has the corresponding telephone number. As a result, a position information display screen 400 is provided on the screen of the broadcast receiver of the broadcast subscriber, as shown in FIG. 24.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An information provision service system comprising:

an information provision unit configured to collect and manage road traffic information or road image information, or both;

an information transmission unit configured to provide a communication service to a subscriber terminal; and an information processing unit configured to collect at least one of the road traffic information, the road image information, and road traffic influence information while interworking with the information provision unit, store collected information on corresponding DBs, manage stored Information, process the road traffic information and the road image information stored on the DBs to be conformed to a transmission type of the communication service in response to a traffic information request of the subscriber terminal, and transmit processed information to the subscriber terminal via the information transmission unit, the information processing unit configured to predict future traffic at a requested region or location and at a requested time based on the road traffic information and the road traffic influence information stored on the DBs in response to a traffic prediction request of the subscriber terminal, process predicted traffic into traffic prediction information to be conformed to the transmission type of the communication service, and transmit the traffic prediction information to the subscriber terminal via the information transmission unit, wherein the road traffic information comprises one or more of vehicle speed information, passage time information, traffic condition information, and detour information, and wherein the road traffic influence information comprises one or more of weather, date, day, time, holidays, consecutive holidays, events, gatherings, construction, and roadside facilities.

2. The system of claim 1, wherein the information processing unit comprises:

a traffic information collection module configured to collect the road traffic information collected and managed by the information provision unit while interworking with the information provision unit, classify collected road traffic information based on region or location, store classified road traffic information in a traffic information DB, and manage stored road traffic information;

an image information collection module configured to collect the road image information collected and managed by the information provision unit while interworking with the information provision unit, classify collected road image information, store classified road image information in an image information DB, and manage stored road image information;

a traffic influence factor collection module configured to collect the traffic influence information at a point of time of collection of the road traffic information or at a predetermined cycle, store collected information in a traffic influence factor DB, and manage stored information; and an information provision module configured to extract information from at least one of the traffic information DB, the image information DB and the traffic influence factor DB, process the extracted information to be conformed to the transmission type of the communication service in response to a request of the subscriber terminal, and transmit the processed information to the subscriber terminal.

3. The system of claim 2, wherein the information transmission unit is a broadcasting station, the subscriber terminal is a broadcast receiver, and the information processing unit comprises:

a broadcasting information provision module configured to process the road traffic information, the road image information, and the traffic influence information transmitted from the information provision module for broadcasting, perform information verification for one or more of data, update cycle, vehicle speed and time, transmit verified information to a broadcast transmitter of the broadcasting station, and providing provide the subscriber terminal with real-time traffic information and traffic prediction information, the broadcasting information provision module configured to process broadcasting position information using map information corresponding to position information of a position information generation device, verify format and displacement of the broadcasting position information, transmit verified information to the broadcast transmitter, and provide the subscriber terminal with broadcasting-based position information; and a broadcasting application module configured to transmit an application for screen display to the broadcast transmitter of the broadcasting station when providing the subscriber terminal with the broadcasting-based real-time traffic information, the traffic prediction, and the position information.

4. The system of claim 3, wherein the information processing unit further comprises a return response module configured to analyze a request of the traffic information and the traffic prediction made by the subscriber terminal via a return channel connected to the information transmission unit, extract necessary information from the traffic information DB, the image information DB, and the traffic influence factor DB, process extracted information into broadcasting traffic information and traffic prediction, perform a series of information verification, and transmit the broadcasting traffic information and traffic prediction to the information transmission unit.

5. An information provision service method for providing information in an information provision service system including an information provision unit configured to collect and manage road traffic information or road image information, or both, a subscriber terminal using a communication service, an information transmission unit configured to provide the subscriber terminal with the communication service, and an information processing unit configured to provide the subscriber terminal with information collected by the information provision unit via the information transmission unit, the method comprising:

collecting one or more of the road traffic information, the road image information, and traffic influence information while interworking with the information provision unit and storing collected information on corresponding DBs;

processing the road traffic information and the road image information stored on the DBs to be conformed to a transmission type of the communication service in response to a traffic information request of the subscriber terminal and transmitting processed information to the subscriber terminal via the information transmission unit; and predicting future traffic at a requested region or location and at a requested time based on the road traffic information and the traffic influence information stored on the DBs in response to a traffic prediction request of the subscriber terminal, processing predicted traffic into traffic prediction information to be conformed to the transmission type of the communication service, and transmitting the traffic prediction information to the subscriber terminal via the information transmission unit, wherein the road traffic information comprises one or more of vehicle speed information, passage time information, traffic condition information, and detour information, and wherein the road traffic influence information comprises one or more of weather, date, day, time, holidays, consecutive holidays, events, gatherings, construction, and roadside facilities.

6. The method of claim 5, wherein the collecting of one or more of the road traffic information, the road image information, and traffic influence information comprises:

collecting one or more of the road traffic information, the road image information, and the position information, and the road traffic influence information by the information processing unit while interworking with the information provision unit according to a predetermined information collection schedule; and classifying collected information based on region or location, storing classified information on corresponding DBs according to information type, and managing stored information.

7. The method of claim 5, wherein the processing of the road traffic information and the road image information comprises:

referring to subscriber authentication information by the information processing unit, when the subscriber terminal requests the traffic information and the traffic prediction via the information transmission unit, and performing client authentication for the subscriber terminal;

identifying communication environment, terminal type, and terminal browser information of the subscriber terminal after the subscriber terminal is confirmed to be a valid subscriber terminal;

analyzing the traffic information and the traffic prediction requested from the subscriber terminal, identifying a request type of the subscriber terminal, and extracting corresponding information from the DBs; and analyzing extracted information, processing analyzed information to be conformed to the communication environment, the terminal type, and terminal browser information of the subscriber terminal, and composing an information request result page.

8. The method of claim 5, wherein the information transmission unit is a broadcasting station, the subscriber terminal is realized as a broadcast receiver, and the method further comprises:

checking whether or not there is a request of the traffic information and the traffic prediction from the subscriber terminal via a return channel connected to the information transmission unit;

analyzing the request, when there is the request, and extracting road traffic information, road image information, and road traffic influence information from corresponding DBs according to the request;

processing extracted road traffic information and road image information into broadcasting traffic information and traffic prediction and performing a series of information verification; and transmitting verified broadcasting traffic information and traffic prediction to the subscriber terminal via the return channel.

9. An information provision service system comprising:

an information provision unit configured to collect and manage text-type road traffic information and road image information;

a subscriber terminal provided with a wireless Internet function;

a wireless Internet interworking unit configured to perform a wireless Internet interwork function for the subscriber terminal; and a wireless Internet traffic information server configured to collect road traffic information and road image information while interworking with the information provision unit, store collected information on corresponding DBs, manage stored information, collect road traffic influence information, accumulate collected information, store accumulated information, manage stored information, process traffic information of a wireless Internet transmission type based on the text-type road traffic information and road image information stored on the DBs when the subscriber terminal requests traffic information at a certain region or location and at a certain time, transmit processed traffic information to the subscriber terminal via the wireless Internet interworking unit, predict future traffic at the certain region or location and at the certain time based on the road traffic information and road traffic influence information accumulated on the DBs in response to a traffic prediction request of the subscriber terminal, process predicted traffic into traffic prediction information of the wireless Internet transmission type, and transmit the traffic prediction information to the subscriber terminal via the wireless Internet interworking unit, wherein the road traffic information comprises one or more of vehicle speed information, passage time information, traffic condition information, and detour information, and wherein the road traffic influence information comprises one or more of weather, date, day, time, holidays, consecutive holidays, events, gatherings, construction, and roadside facilities.

10. The system of claim 9, wherein the wireless Internet traffic information server comprises:

a traffic information collection module configured to collect the road traffic information collected and managed by the information provision unit while interworking with the information provision unit, classify collected road traffic information based on region or location, and store classified road traffic information on a traffic information DB;

an image information collection module configured to collect the road image information collected and managed by the information provision unit while interworking with the information provision unit, classify collected road image information based on region or location, and store classified road image information on an image information DB;

a traffic influence factor collection module configured to collect the road traffic influence information of each region or location at a point of time of collection of the road traffic information or the road image information and at a predetermined cycle, store collected information on a traffic influence factor DB, and manage stored information; and a traffic information provision module configured to extract necessary road traffic information and road image information from the traffic information DB and the image information DB when the subscriber terminal requests traffic information via the wireless Internet interworking unit, process wireless Internet traffic information regarding a requested region or location based on extracted information, transmit processed information to the subscriber terminal via the wireless Internet interworking unit, extracting road traffic information and traffic influence information at the requested region or location and at a requested time from the traffic information DB and the traffic influence factor DB when the subscriber terminal requests traffic prediction at the request region or location and at the requested time via the wireless Internet interworking unit, collect the traffic influence information by controlling the traffic influence information collection module, predict road traffic at the requested region or location and at the requested time based on extracted and collected information, process corresponding wireless Internet future traffic prediction information, and transmit processed information to the subscriber terminal via the wireless Internet interworking unit.

11. The system of claim 10, wherein the wireless Internet traffic information server further includes a client information DB for storing at least one of authentication information on subscriber terminals, traffic information service particulars, subscriber communication environment, subscriber terminal type, and terminal browser version information.

12. The system of claim 10, wherein the traffic information provision module provides a wireless Internet-based traffic information service by identifying communication environment of the subscriber terminal, subscriber terminal type, and terminal browser version information, analyzing a traffic information and traffic prediction request of the subscriber terminal, extracting road traffic information and road image information at a certain region or location and at a certain time and road traffic influence information from the traffic information DB, the image information DB, and the traffic influence factor DB, respectively, to process wireless Internet traffic information as requested, processing wireless Internet traffic information as a traffic information and traffic prediction request result for the subscriber terminal, and transmitting the wireless Internet traffic information to the wireless Internet interworking unit.

13. The system of claim 10, wherein the traffic influence factor collection module is adapted to collect traffic influence information corresponding to road traffic information collected by the traffic information collection module at a point of time of collection of the road traffic information and at a predetermined cycle, to store collected information on the traffic influence factor DB, to collect road traffic influence information at date and time of requested traffic prediction under control of the traffic information provision module, and transmit collected information to the traffic information provision module.

14. An information provision service method comprising:

- collecting text-type road traffic information and road image information by means of interwork between a wireless Internet traffic information server and an information provision unit, storing collected information on corresponding DBs, and managing stored information;
- identifying communication environment and terminal environment of a subscriber terminal in response to a traffic information request of the subscriber terminal via wireless Internet, analyzing the traffic information request, and checking an information request region or location;
- extracting text-type traffic information and/or road image information of a certain region or location from the DBs according to a type of traffic information requested by the subscriber terminal and composing a traffic information request result page for wireless Internet;
- transmitting the traffic information request result page to a wireless Internet interworking unit to provide traffic information based on wireless Internet as requested by the subscriber terminal;
- collecting the road traffic information and road traffic influence information by a wireless Internet traffic prediction server, accumulating collected information, storing accumulated information on DBs, and managing stored information;
- analyzing a traffic prediction request of the subscriber terminal via wireless Internet and identifying a region or location of requested traffic prediction and requested date and time;
- accessing the DBs, extracting road traffic information and road traffic influence information corresponding to the region or location of requested traffic prediction and collecting road traffic influence information at the date and time of requested traffic prediction; and
- composing a traffic prediction request result page for wireless Internet based on extracted and collected information and providing the subscriber terminal with a traffic prediction service via the wireless Internet interworking unit,
- wherein the road traffic information comprises one or more of vehicle speed information, passage time information, traffic condition information, and detour information, and
- wherein the road traffic influence information comprises one or more of weather, date, day, time, holidays, consecutive holidays, events, gatherings, construction, and roadside facilities.

15. The method of claim 14, wherein the collecting of the text-type road traffic information and road image information comprises:

- causing the wireless Internet traffic information server and a traffic information server, an image information server, and various content servers acting as information provision unit to interwork with each other according to a predetermined information collection schedule to collect road traffic information collected and managed by the traffic information server;
- classifying collected road traffic information based on region or location and information type, storing classified information on a traffic information DB in a text type, and managing stored information;
- classifying collected road image information based on region or location and information type, storing classified information on an image information DB, and managing stored information; and
- storing collected traffic influence information on a traffic influence factor DB so that the information corresponds to the road traffic information, accumulating stored information, and managing accumulated information.

16. The method of claim 14, wherein the identifying of the communication environment and terminal environment of the subscriber terminal comprises:

- performing client authentication for the subscriber terminal based on subscriber authentication information of a client information DB by the Internet traffic information server, when a subscriber terminal using a mobile communication terminal requests traffic information and traffic prediction service via the wireless Internet interworking unit;
- identifying communication environment, terminal type, and terminal browser version information of the subscriber terminal, the terminal type and the terminal browser version information being terminal environment, based on the client information DB, when the subscriber terminal is confirmed to be a valid subscriber terminal; and
- analyzing traffic information and traffic prediction requested by the subscriber terminal and identifying a region or location and date and time.

17. The information provision service method of claim 14, wherein the collecting of the text-type road traffic information and road image information by means of interwork between the wireless Internet traffic information server and the information provision unit, the identifying of the communication environment and terminal environment of the subscriber terminal, the extracting of the text-type traffic information and/or road image information, and the transmitting of the traffic information request result page are performed to provide the subscriber terminal with the traffic information, and the collecting of the road traffic information and road traffic influence information by the wireless Internet traffic prediction server, the analyzing of the traffic prediction request of the subscriber terminal, the accessing of the DBs, and the composing of the traffic prediction request result page are performed to provide the subscriber terminal with the traffic prediction information.

18. The information provision service method of claim 17, wherein the collecting of the text-type road traffic information and road image information by means of interwork between the wireless Internet traffic information server and the information provision unit and the collecting of the road traffic information and road traffic influence information by the wireless Internet traffic prediction server are simultaneously performed.

19. The information provision service method of claim 17, wherein the collecting of the text-type road traffic information and road image information by means of interwork between the wireless Internet traffic information server and the information provision unit and the collecting of the road traffic information and road traffic influence information by the wireless Internet traffic prediction server are performed at different times.

20. An information provision service system for providing traffic information and a traffic prediction service, the system comprising:

an information provision unit configured to collect road traffic information and road image information and manage collected information;

a broadcasting station configured to broadcast to a broadcast receiver; and a broadcasting traffic information server configured to collect road traffic information and road image information while interworking with the information provision unit, store collected information on a traffic information DB and a traffic image information DB, manage stored information, collect road traffic influence information of a region or location, accumulate collected information, store accumulated information on a traffic influence factor DB, manage stored information, process the road traffic information and road image information for broadcasting, perform information verification, broadcast traffic information to the broadcasting station, provide broadcast receivers with a broadcasting-based traffic information service via the broadcasting station and a broadcasting network, predict future road traffic corresponding to a predetermined prediction period based on the road traffic information and the road traffic influence information, compose broadcasting traffic prediction information accordingly, perform information verification, transmit verified information to the broadcasting station, and provide the broadcast receivers with a traffic prediction service corresponding to the predetermined prediction period via the broadcasting station and the broadcasting network, wherein the road traffic information comprises one or more of vehicle speed information, passage time information, traffic condition information, and detour information, and wherein the road traffic influence information comprises one or more of weather, date, day, time, holidays, consecutive holidays, events, gatherings, construction, and roadside facilities.

21. The system of claim 20, wherein the broadcasting traffic information server is adapted to access various information stored on the traffic information DB, the image information DB, and the traffic influence factor DB in response to a traffic information and traffic prediction request of the broadcast receiver via a return channel and transmit broadcasting traffic information of a requested region or location and predicted broadcasting traffic prediction information to the broadcasting station so that broadcasting traffic information and a traffic prediction of the requested region or location are transmitted to the broadcast receiver via the broadcasting station and the return channel.

22. The system of claim 20, wherein the broadcasting traffic information server comprises:

a traffic information collection module configured to collect a series of road traffic information collected and managed by the information provision unit while interworking with the information provision unit, classify collected information based on information type, store classified information on the traffic information DB according to information type, and manage stored information;

an image information collection module configured to collect a series of road image information collected and managed by the information provision unit while interworking with the information provision unit, classify collected information based on information type, store classified information on the image information DB according to information type, and manage stored information;

a traffic influence information collection module configured to collect road traffic influence information at a point of time of collection of the road traffic information and at a predetermined cycle, store collected information on the traffic influence factor DB, and manage stored information;

a traffic information provision module configured to extract necessary information from the traffic information DB, the image information DB, and the traffic influence factor DB at an information request of the broadcast receiver via the broadcasting station, process extracted information to be conformed to a transmission type of the information provision service, and transmit the processed information to the broadcast receiver;

a broadcasting information provision module configured to process the road traffic information, the road image information, and the road traffic influence information transmitted from the traffic information provision module for broadcasting, perform at least one of information verification including data verification, update cycle verification, and vehicle speed and time verification, transmit verified information to a broadcast transmitter of the broadcasting station, to provide the broadcasting receiver with broadcasting-based real-time traffic information and traffic prediction, process broadcasting position information using map information corresponding to position information, perform verification of format and displacement of the broadcasting position information, transmit verified information to the broadcast transmitter of the broadcasting station to provide the broadcast receiver with broadcasting-based position information; and a broadcasting application module configured to transmit an application for screen display to the broadcast transmitter of the broadcasting station to provide the broadcast subscriber with the broadcasting-based real-time traffic information, the traffic prediction, and the position information.

23. An information provision service method comprising:

collecting road traffic information, road image information, and road traffic influence information by means of interworking between a broadcasting traffic information server and an information provision unit, storing collected information on corresponding DBs, and managing stored information;

periodically extracting road traffic information and road image information stored on the corresponding DBs, processing extracted information into satellite broadcasting traffic information and performing at least one type of information verification of data, update cycle, and vehicle speed and time;

extracting various road traffic information and road traffic influence information accumulated and stored on the corresponding DBs, predicting road traffic corresponding to a predetermined prediction period, composing broadcasting traffic prediction information for broadcasting, and performing at least one type of information verification of data, update cycle , and vehicle speed and time; and transmitting verified broadcasting traffic information or traffic prediction information to a broadcast transmitter of a broadcasting station to provide broadcasting receivers with a broadcasting-based traffic information service via the broadcast transmitter and a broadcasting network, wherein the road traffic information comprises one or more of vehicle speed information, passage time information, traffic condition information, and detour information, and wherein the road traffic influence information comprises one or more of weather, date, day, time, holidays, consecutive holidays, events, gatherings, construction, and roadside facilities.

24. The method of claim 23, further comprising:

checking whether or not there is a traffic information and traffic prediction request from a broadcast receiver via a return channel of the broadcasting station while providing the broadcast receivers with the broadcasting-based traffic information service;

analyzing a traffic information request, when there is the traffic information request from the broadcast receiver, and extracting road traffic information and road image information of an information request region or location by accessing to corresponding DBs;

processing extracted road traffic information and road image information into broadcasting traffic information for broadcasting and performing information verification of the broadcasting traffic information;

analyzing a traffic prediction request, when there is the traffic prediction request from the broadcast receiver, and identifying a traffic prediction request region or location and a prediction request period;

extracting road traffic information and traffic influence factor information on corresponding to identified traffic prediction request region or location and prediction request period by accessing to corresponding DBs;

composing broadcasting traffic prediction information corresponding to the prediction request period based on extracted road traffic information and road traffic influence factor information and performing information verification; and transmitting verified broadcasting traffic information to the corresponding broadcast receiver via the return channel of the broadcasting station to provide the broadcast receiver with traffic information of the requested region or location.

* * * * *